United States Patent
Lee et al.

(10) Patent No.: US 11,651,061 B2
(45) Date of Patent: May 16, 2023

(54) MEMORY CONTROLLER AND STORAGE DEVICE INCLUDING THE SAME

(71) Applicant: SAMSUNG ELECTRONICS CO., LTD., Suwon-si (KR)

(72) Inventors: Seungjae Lee, Hwaseong-si (KR); Mingon Shin, Uiwang-si (KR); Jisoo Kim, Seongnam-si (KR); Hwasoo Lee, Suwon-si (KR); Myeongjong Ju, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 228 days.

(21) Appl. No.: 17/036,844

(22) Filed: Sep. 29, 2020

(65) Prior Publication Data

US 2021/0216616 A1 Jul. 15, 2021

(30) Foreign Application Priority Data

Jan. 10, 2020 (KR) .................. 10-2020-0003885

(51) Int. Cl.
*H04L 29/06* (2006.01)
*G06F 21/32* (2013.01)
(Continued)

(52) U.S. Cl.
CPC .......... *G06F 21/32* (2013.01); *G06F 12/1408* (2013.01); *H04L 9/3231* (2013.01);
(Continued)

(58) Field of Classification Search
CPC ............... G06F 21/32; G06F 21/1408; G06F 2221/2107; G06F 2221/2148; G06F 2221/2147; H04L 9/323
(Continued)

(56) References Cited

U.S. PATENT DOCUMENTS 8,171,309 B1 * 5/2012 Poo .................. G06F 11/3648
713/192
9,081,946 B2 7/2015 Fruhauf et al.
(Continued)

FOREIGN PATENT DOCUMENTS

EP 2254072 A1 11/2010
JP 4833294 B2 12/2011
KR 10-1385929 B1 4/2014

OTHER PUBLICATIONS

Communication dated Apr. 23, 2021 issued by the European Patent Office in application No. 21150564.9.
(Continued)

*Primary Examiner* — Evans Desrosiers
(74) *Attorney, Agent, or Firm* — Sughrue Mion, PLLC

(57) ABSTRACT

A memory controller and a storage device including the same are disclosed. A memory controller for controlling a nonvolatile memory includes: a security access control module configured to convert biometric authentication data received from a biometric module into security configuration data having a data format according to a security standard protocol and perform, based on the security configuration data, at least one of authority registration and authority authentication of a user authority set for an access control of a secure area of the nonvolatile memory, encrypted user data being stored in the secure area; and a data processing unit configured to, based on an access to the secure area being permitted, encrypt user data received from a host device or decrypt the encrypted user data read from the secure area.

19 Claims, 21 Drawing Sheets

(51) Int. Cl.
*G06F 12/14* (2006.01)
*H04L 9/32* (2006.01)

(52) U.S. Cl.
CPC ............... *G06F 2221/2107* (2013.01); *G06F 2221/2117* (2013.01); *G06F 2221/2143* (2013.01); *G06F 2221/2147* (2013.01)

(58) Field of Classification Search
USPC ......................................................... 713/193
See application file for complete search history.

(56) References Cited

U.S. PATENT DOCUMENTS

| | | |
|---|---|---|
| 9,230,080 B2 | 1/2016 | Tsukamoto et al. |
| 9,449,162 B2 | 9/2016 | Lee et al. |
| 9,961,077 B2 | 5/2018 | Lindemann |
| 2008/0155268 A1 | 6/2008 | Jazayeri et al. |
| 2011/0087889 A1 | 4/2011 | Iyer et al. |
| 2018/0232509 A1 | 8/2018 | Park et al. |
| 2021/0217013 A1* | 7/2021 | Agrawal ............ G06Q 20/4012 |

OTHER PUBLICATIONS

"TCG Storage, Opal, and NVMe", Trusted Computing Group and NVM Express Joint White Paper, Aug. 2015, Total 11 pages.

"TCG Storage Application Note Encrypting Drives Compliant with Opal SSC", Trusted Computing Group, Feb. 10, 2010, Total 92 pages.

\* cited by examiner

FIG. 4A

| UID | Name | Enable | Operation | Credential | ... |
|---|---|---|---|---|---|
| 00 00 00 09 00 01 00 01 | "Admin1" | T | Password | C_PIN_Admin1 | ... |
| 00 00 00 09 00 03 00 01 | "User1" | T | Password | C_PIN_User1 | ... |
| 00 00 00 09 00 03 00 02 | "User2" | F | Password | C_PIN_User2 | ... |

< Authority Table >

FIG. 4B

| UID | Name | Range | R/W Lock Enable | R/W Lock | ... |
|---|---|---|---|---|---|
| 00 00 00 0B 00 01 00 01 | "Admin1" | LBA1-LBA9 | T | T | ... |
| 00 00 00 0B 00 03 00 01 | "User1" | LBA1-LBA4 | F | F | ... |
| 00 00 00 0B 00 03 00 02 | "User2" | LBA5-LBA8 | T | F | ... |

< Locking Table >

FIG. 7

| R | | | SCSD | |
|---|---|---|---|---|
| 0000 | 00000000 | 07EE0000 | 00000000 | 00000000 |
| 0010 | 0000006C | 0000006C | 00000000 | 00000000 |
| 0020 | 00000000 | 00000000 | 00000054 | 00000000 |
| 0030 | 00000000 | 00000048 | F8A80000 | 00000000 |
| 0040 | 00FFA800 | 00000000 | 00FF02F0 | 01A80000 |
| 0050 | 02050000 | 000201F2 | 00D011 3C | 41646D69 |
| 0060 | 6E315F70 | 61737377 | 6F72643E | F3F203A8 |
| 0070 | 00000009 | 00010001 | F3F1F9F0 | 000000F1 |
| 0080 | 00000000 | 00000000 | 00000000 | 00000000 |
| ⋮ | ⋮ | ⋮ | | |
| 01E0 | 00000000 | 00000000 | 00000000 | 00000000 |
| 01F0 | 00000000 | 00000000 | 00000000 | 00000000 |

MEMORY CONTROLLER AND STORAGE DEVICE INCLUDING THE SAME

CROSS-REFERENCE TO THE RELATED APPLICATION

This application is based on and claims priority to Korean Patent Application No. 10-2020-0003885, filed on Jan. 10, 2020, in the Korean Intellectual Property Office, the disclosure of which is incorporated by reference herein in its entirety.

BACKGROUND

Embodiments of the inventive concept relate to a storage device, and more particularly, to a memory controller supporting self-encryption and a storage device including the same.

A flash memory as a nonvolatile memory may keep data stored therein even when power is cut off, and storage memory devices including a flash memory such as a solid state drive (SSD) or a memory card are widely used. Recently, in response to increased demand for data security, security functions for safely storing key data and preventing data leakage even when a storage device is discarded or stolen have been developed. A self-encrypting drive (SED), one of the security functions for storage devices, may provide for high data protection by encrypting data to write the encrypted data and decrypting the encrypted data to read the data.

However, a security function provided by a storage device may operate dependently on a command of a host device, and thus, when the host device does not support transmission of a command instructing the use of the security function of the storage device, the security function of the storage device may not be used. Therefore, there is a need for a storage device capable of performing the security function under control of various host devices.

SUMMARY

One or more embodiments of the inventive concept provide a memory controller capable of providing a security function of a storage device even when the storage device is connected to various types of host devices, and the storage device including the same.

According to an aspect of an embodiment of the inventive concept, there is provided a memory controller for controlling a nonvolatile memory, the memory controller including: a security access control module configured to convert biometric authentication data received from a biometric module into security configuration data having a data format according to a security standard protocol, and configured to perform, based on the security configuration data, at least one of authority registration and authority authentication of a user authority, the user authority being set for an access control of a secure area of the nonvolatile memory, encrypted user data being stored in the secure area; and a data processing unit configured to, based on an access to the secure area being permitted, encrypt user data received from a host device or decrypt the encrypted user data read from the secure area.

According to an aspect of an embodiment of the inventive concept, there is provided a storage device including: a nonvolatile memory including a secure area in which encrypted user data is stored; and a memory controller configured to perform authority authentication on a user authority by determining, based on biometric authentication data, a field value of a first feature set according to a security standard protocol with respect to the user authority for access to the secure area, and set the secure area of the nonvolatile memory to an unlock state based on the authority authentication being successful.

According to an aspect of an embodiment of the inventive concept, there is provided a storage device including: a nonvolatile memory including a secure area in which encrypted user data is stored; and a memory controller configured to control the nonvolatile memory, wherein the memory controller is further configured to: based on the storage device being connected to a first host device, perform authority authentication of a user having an access authority to the secure area based on a password received from the first host device according to a security protocol, the security protocol being set for communication with the first host device, and based on the storage device being connected to a second host device, perform the authority authentication based on biometric authentication data received from a biometric module.

BRIEF DESCRIPTION OF THE DRAWINGS

Embodiments of the inventive concept will be more clearly understood from the following detailed description taken in conjunction with the accompanying drawings in which:

FIGS. 4A and 4B are implementation examples of feature set tables configured by a security access control module, according to example embodiments of the inventive concept;

FIG. 7 illustrates an example of a data format according to a security standard protocol;

DETAILED DESCRIPTION

Hereinafter, example embodiments of the inventive concept will be described in detail with reference to the accompanying drawings.

Figure 1:
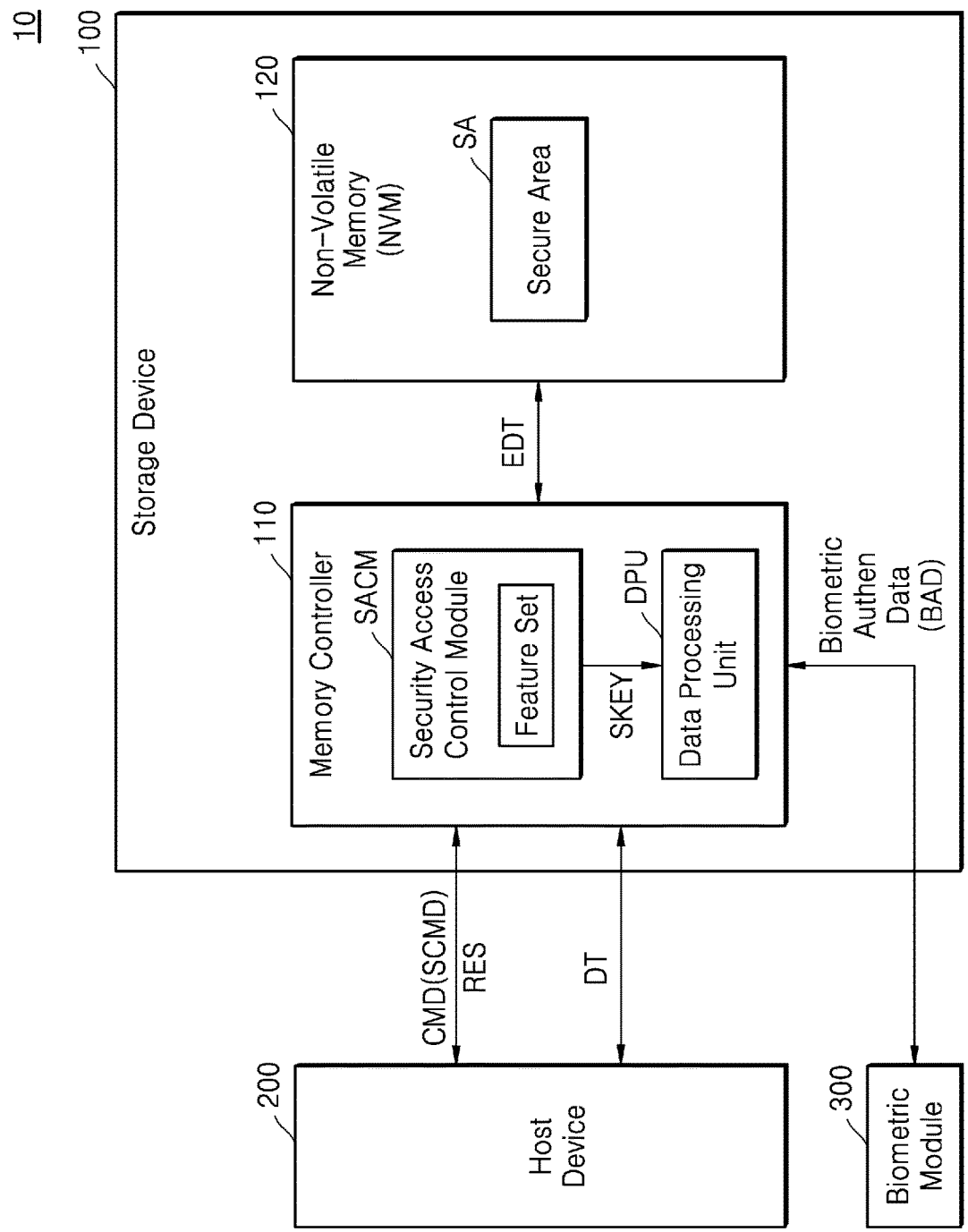
FIG. 1 is a block diagram of a storage device and a storage system, according to an example embodiment of the inventive concept.

FIG. 1 is a block diagram of a storage device 100 and a storage system 10, according to an example embodiment of the inventive concept.

Referring to FIG. 1, the storage system 10 may include the storage device 100, a host device 200, and a biometric module 300, and the storage device 100 may include a memory controller 110 and a nonvolatile memory (NVM) 120.

The storage system 10 may be implemented by, for example, a personal computer (PC), a data server, a network-coupled storage, an Internet of Things (IoT) device, or a portable electronic device. The portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, or the like.

According to some embodiments of the inventive concept, the storage device 100 may be an internal memory embedded in an electronic device. For example, the storage device 100 may be a solid state drive (SSD), an embedded universal flash storage (UFS) memory device, or an embedded multi-media card (eMMC), but is not limited thereto. According to some embodiments of the inventive concept, the storage device 100 may be an external memory detachably attached to an electronic device. For example, the storage device 100 may include a portable SSD, a UFS memory card, a compact flash (CF) card, a secure digital (SD) card, a micro secure digital (Micro-SD) card, a mini secure digital (Mini-SD) card, an extreme digital (xD) card, or a memory stick.

The host device (or herein referred to as a host) 200 may communicate with the storage device 100 through various interfaces, transmit to the storage device 100 a command CMD and/or data DT to be stored in the NVM 120, and receive from the storage device 100 a response RES and/or the data DT read from the NVM 120. For example, the host device 200 may be implemented by an application processor (AP) or a system-on-a-chip (SoC). Alternatively, for example, the host device 200 may be implemented by an integrated circuit, a motherboard, or a database server but is not limited thereto.

According to an embodiment of the inventive concept, the host device 200 and the storage device 100 may communicate with each other when electrically connected through a cable in a hot-pluggable interface scheme.

In response to the command CMD received from the host device 200, the storage device 100 may store data (hereinafter, referred to as user data) DT received from the host device 200, or read user data DT stored in the NVM 120 and transmit the user data DT to the host device 200.

The storage device 100 may communicate with the host device 200 through a security standard protocol, and a security function of the storage device 100 may be configured under control of the host device 200. In the embodiment of the inventive concept, the configuration of the security function indicates a configuration related to the use of the security function to perform the security function. The host device 200 may provide, to the storage device 100, a command (hereinafter, referred to as a security command) SCMD according to the security standard protocol to configure the security function of the storage device 100, and receive a response RES to the security command SCMD from the storage device 100.

The security command SCMD and the response RES may have a data format according to the security standard protocol, and the security command SCMD may include a request and a setting value associated with the configuration of the security function. According to an embodiment of the inventive concept, the setting value may include a password for user authority authentication. For example, the storage device 100 may communicate with the host device 200 through a Trusted Computing Group (TCG) protocol. The security command SCMD and the response RES having a data format according to the TCG protocol may be transmitted and received between the storage device 100 and the host device 200. For example, the security command SCMD and the response RES may have a data block (or a data packet) of 512 bytes. However, embodiments of the inventive concept are not limited thereto, and security standard protocols provided by various interface schemes such as an advanced technology attachment (ATA) interface and a serial ATA (SATA) interface may be applied between the host device 200 and the storage device 100.

However, some of various devices which may be implemented as the host device 200 cannot configure the security function of the storage device 100. For example, the security standard protocol may not be applicable between the host device 200 and the storage device 100, and the host device 200 may not provide the security command SCMD to the storage device 100. In this case, according to an embodiment of the inventive concept, the storage device 100 may configure the security function by independently determining a feature set according to the security standard protocol based on biometric authentication data (BAD) received from the biometric module 300. For example, the storage device 100 may independently determine the setting value based on the BAD received from the biometric module 300, instead of receiving the setting value from the host device 200. According to an embodiment of the inventive concept, the storage device 100 may generate security configuration data corresponding to the security command SCMD, e.g., security configuration data having a data format according to the security standard protocol, based on the BAD, and configure the security function based on the security configuration data. Accordingly, the security function of the storage device 100 may be performed. This will be described below in detail.

The NVM 120 may indicate a memory module or a memory device having a characteristic that stored data is maintained even when power is cut off. According to an embodiment of the inventive concept, the NVM 120 may include a flash memory device, e.g., a NAND flash memory device. According to an embodiment of the inventive concept, the NVM 120 may include a vertical NAND (VNAND) flash memory device having a three-dimensional array structure. However, the NVM 120 is not limited thereto and may include, for example but not limited to, a resistive memory device such as resistive random access memory (ReRAM), phase change random access memory (PRAM), or magnetic random access memory (MRAM). Alternatively, the NVM 120 may be implemented by not only a semiconductor memory device but also a magnetic disc device. Hereinafter, for convenience of description, the NVM 120 is described as a NAND flash memory device, but it should be understood that embodiments of the inventive concept are not limited thereto. According to an embodiment of the inventive concept, the NVM 120 may include a plurality of NVM chips, and the plurality of NVM chips may communicate with the memory controller 110 through a plurality of channels.

According to the characteristic of the NVM 120 that stored data is maintained even when power is cut off, it is needed that data stored in the NVM 120 is maintained in a secure state. For example, when the storage device 100 is reused or discarded, or when the storage device 100 is used by a non-authorized user, it is necessary that leakage of security-required data stored in the storage device 100 is prevented. To this end, the storage device 100 may support a self-encryption function. The storage device 100 may encrypt the user data DT received from the host device 200 and store the encrypted user data EDT in a secure area SA of the NVM 120. Because the encrypted user data EDT stored in the secure area SA of the NVM 120 is maintained in an encrypted state, the encrypted user data EDT may be maintained in a secure state even when power supplied to the storage device 100 is cut off. As described above, the storage device 100 supporting the self-encryption function may be referred to as a self-encrypting device or self-encrypting drive (SED).

The memory controller 110 may control a general operation of the storage device 100 and control write and read operations of the NVM 120. In addition, the memory controller 110 may support the security function, e.g., the self-encryption function, of the storage device 100. The memory controller 110 may encrypt the user data DT received from the host device 200 and store the encrypted user data EDT in the secure area SA of the NVM 120. In addition, the memory controller 110 may read the encrypted user data EDT from the NVM 120, decrypt the encrypted user data EDT, and provide the user data DT to the host device 200.

The memory controller 110 may control access to the secure area SA of the NVM 120, e.g., control configuration of the security function. The memory controller 110 may register a user authority of a user accessible to the secure area SA of the NVM 120, and permit, when authentication on the user authority (i.e., user authority authentication) is successful, access to the secure area SA of the NVM 120. In other words, when the user authority authentication performed by the memory controller 110 is successful, the host device 200 may access the secure area SA of the NVM 120 to write or read the user data DT.

The memory controller 110 may include a security access control module SACM and a data processing unit DPU. The security access control module SACM may configure the security function by managing a user right of a user having an access authority to the secure area SA of the NVM 120. For example, the security access control module SACM may register, authenticate, and/or delete a user authority. The data processing unit DPU may encrypt the user data DT received from the host device 200 or decrypt the encrypted user data EDT read from the secure area SA of the NVM 120, based on a security key SKEY The security key SKEY may be created based on a random characteristic key, which is created in a hardware logic inside the storage device 100, or the security key SKEY may be created based on a combination of the random characteristic key and a unique key provided from an outside (e.g., the host device 200). For example, the security access control module SACM may set the storage device 100 to a lock state or an unlock state by encrypting or decrypting the security key SKEY based on a unique value (or a password) used for registration and/or authentication of a user authority. Particularly, the security access control module SACM may set the lock state or the unlock state in association with a read operation and/or a write operation on the secure area SA of the NVM 120. When the security access control module SACM encrypts the security key SKEY based on the unique value and stores the encrypted security key SKEY, the secure area SA of the NVM 120 may be set to the lock state in which access for read and/or write is not permitted. When the user authority authentication is successful, the security access control module SACM may decrypt the encrypted security key SKEY to set the secure area SA of the NVM 120 to the unlock state in which access for read and/or write operation is permitted. The data processing unit DPU may encrypt, based on the security key SKEY, the user data DT to be stored in the secure area SA or decrypt the encrypted user data EDT read from the secure area SA.

As described above, the security standard protocol may be applied between the host device 200 and the storage device 100 to provide the security function of the storage device 100, and the host device 200 may transmit the security command SCMD to the storage device 100 based on the security standard protocol. For example, the host device 200 may transmit a user authority registration request and a password for user authority authentication to the storage device 100 as the security command SCMD and also provide a user authority activation request, a setting value for setting the NVM 120 to the lock state or the unlock state, and the like as the security command SCMD. The setting value may be defined in the security standard protocol and may include field values of a feature set according to the security standard protocol for a user authority. For example, the host device 200 may generate the security command SCMD according to the TCG protocol and provide the security command SCMD to the storage device 100. In this case, the security command SCMD may be packetized (or command-tokenized) according to a data format of the security standard protocol, and the host device 200 may transmit the packetized command (e.g., a data packet) to the storage device 100, particularly, to the memory controller 110. The security access control module SACM may set field values of a feature set for a user authority based on the security command SCMD received from the host device 200 to register, authenticate, and/or delete the user authority and to set the NVM 120 to the lock state or the unlock state.

As described above, in the storage device 100 according to an embodiment of the inventive concept, the memory controller 110 may configure the security function under control of the host device 200, in other words, based on the security command SCMD, and also independently configure the security function based on the BAD received from the biometric module 300. For example, the memory controller 110 may manage a user authority according to the security standard protocol based on the BAD. The security access control module SACM may register, authenticate, and/or delete a user authority based on the BAD. According to an embodiment of the inventive concept, the security access control module SACM may convert the BAD into security configuration data having a data format according to the security standard protocol and register, authenticate, and/or delete a user authority based on the security configuration data.

The security access control module SACM may set field values of a feature set for a user authority based on the BAD received from the biometric module 300. According to an embodiment of the inventive concept, the security access control module SACM may set a credential value for a user authority based on the BAD. Accordingly, the user authority may be registered by using the credential value. In addition, when the storage device 100 is connected to the host device 200, the security access control module SACM may receive the BAD from the biometric module 300 and perform user authority authentication based on the BAD. When the user authority authentication is successful, the security access control module SACM may independently set the NVM 120 (particularly, the secure area SA of the NVM 120) to the lock state or the unlock state. According to an embodiment of the inventive concept, the security access control module SACM may register a user authority based on the command CMD for requesting registration of the user authority, which is received from the host device 200, and the BAD received from the biometric module 300, and thereafter independently perform user authority authentication based on the BAD without receiving the security command SCMD from the host device 200.

As such, because the memory controller 110 may manage a user authority (e.g., user authority authentication, user authority registration, and user authority deletion) according to the security standard protocol based on the BAD, without control of the host device 200, and set the NVM 120 to the lock state or the unlock state, even when the storage device 100 is connected to the host device 200 which does not provide the security command SCMD, the security function of the storage device 100 may be used (in other words, activated). The memory controller 110 may perform user authority authentication based on a user password received from the host device 200 and perform data encryption and decryption (in other words, self-encryption) when the user authority authentication is successful, and may also perform the user authority authentication based on the BAD received from the biometric module 300 even when the user password is not received from the host device 200.

The biometric module 300 may sense a living body of a user to obtain biometric data, e.g., a fingerprint, an iris, a voice, or the like, and provide the BAD, based on the biometric data, to the memory controller 110. The biometric module 300 may be implemented by, for example but not limited to, a recognition module capable of obtaining biometric data, such as a fingerprint recognition module, an iris recognition module, a face recognition module, a vein recognition module, a voice recognition module, and/or the like.

According to an embodiment of the inventive concept, the biometric module 300 may convert the biometric data into biometric information based on a set data format and store and manage the biometric information. The biometric module 300 may store, in an NVM included therein, biometric information of each of users of which a user authority is registered. The biometric module 300 may generate a unique value according to biometric information and transmit a biometric authentication message and the unique value to the memory controller 110 as the BAD. In a biometric information registration operation, the biometric module 300 may transmit a biometric information registration message (or biometric information registration completion message) and the unique value to the memory controller 110. Upon receiving the biometric information registration message (or the biometric information registration completion message), the memory controller 110 may register a user authority based on the unique value. Thereafter, in a user authority authentication operation, the biometric module 300 may obtain biometric data of a user; generate, when biometric information based on the obtained biometric data is matched with the pre-stored biometric information, a unique value based on the matched biometric information; and transmit a biometric authentication success message and the unique value to the memory controller 110. Upon receiving the biometric authentication success message, the memory controller 110 may perform user authority authentication based on the unique value.

For example, when the biometric module 300 is a fingerprint recognition module, the fingerprint recognition module may obtain a fingerprint image as biometric data by scanning a fingerprint of a user and convert the fingerprint image into fingerprint information based on a set format. The fingerprint recognition module may generate a unique value based on the fingerprint information and transmit, to the memory controller 110, a fingerprint information registration message or a fingerprint authentication success message and the unique value as the BAD. The memory controller 110, particularly, the security access control module SACM, may register a user authority by setting a credential value for the user authority based on the unique value or perform user authority authentication based on the unique value. For example, the security access control module SACM may generate a hash value by hashing a unique value received with the fingerprint information registration message in the BAD and set the hash value as a credential value, thereby registering a user authority. When user authority authentication is performed, the security access control module SACM may perform the user authority authentication by comparing the credential value with a hash value generated by hashing a received unique value received with the fingerprint authentication success message in the BAD.

According to an embodiment of the inventive concept, the biometric module 300 may provide biometric data or biometric information obtained by converting the biometric data into a preset data format to the memory controller 110 as the BAD, and the memory controller 110 may perform at least one of user authority registration and user authority authentication based on the biometric data or the biometric information.

The storage device 100 may be connected to various types of host devices 200 and operate under control of the host device 200. Assuming that the security function of the storage device 100 is activated based on the security command SCMD received from the host device 200, when the host device 200 cannot provide the security command SCMD, in other words, when the security standard protocol cannot be applied to the host device 200, the security function of the storage device 100 cannot be used (or cannot be activated). However, in the storage device 100 according to an embodiment of the inventive concept, the memory controller 110 may configure the security function by setting a feature set according to the security standard protocol under control of the host device 200, in other words, based on the security command SCMD from the host device 200, and also configure the security function by independently determining the feature set according to the security standard protocol without control of the host device 200 based on the BAD received from the biometric module 300. For example, even when a user authority request and a password are not received from the host device 200 as the security command SCMD, the storage device 100 may generate security configuration data corresponding to the security command SCMD based on the BAD and perform user authority authentication by using the security configuration data, and thus, the storage device 100 may provide the security function even when the storage device 100 is connected to the host device 200 which does not provide the security command SCMD. Therefore, even when the storage device 100 is connected to various types of host devices 200, the security function of the storage device 100 may be used.

Figure 2A:
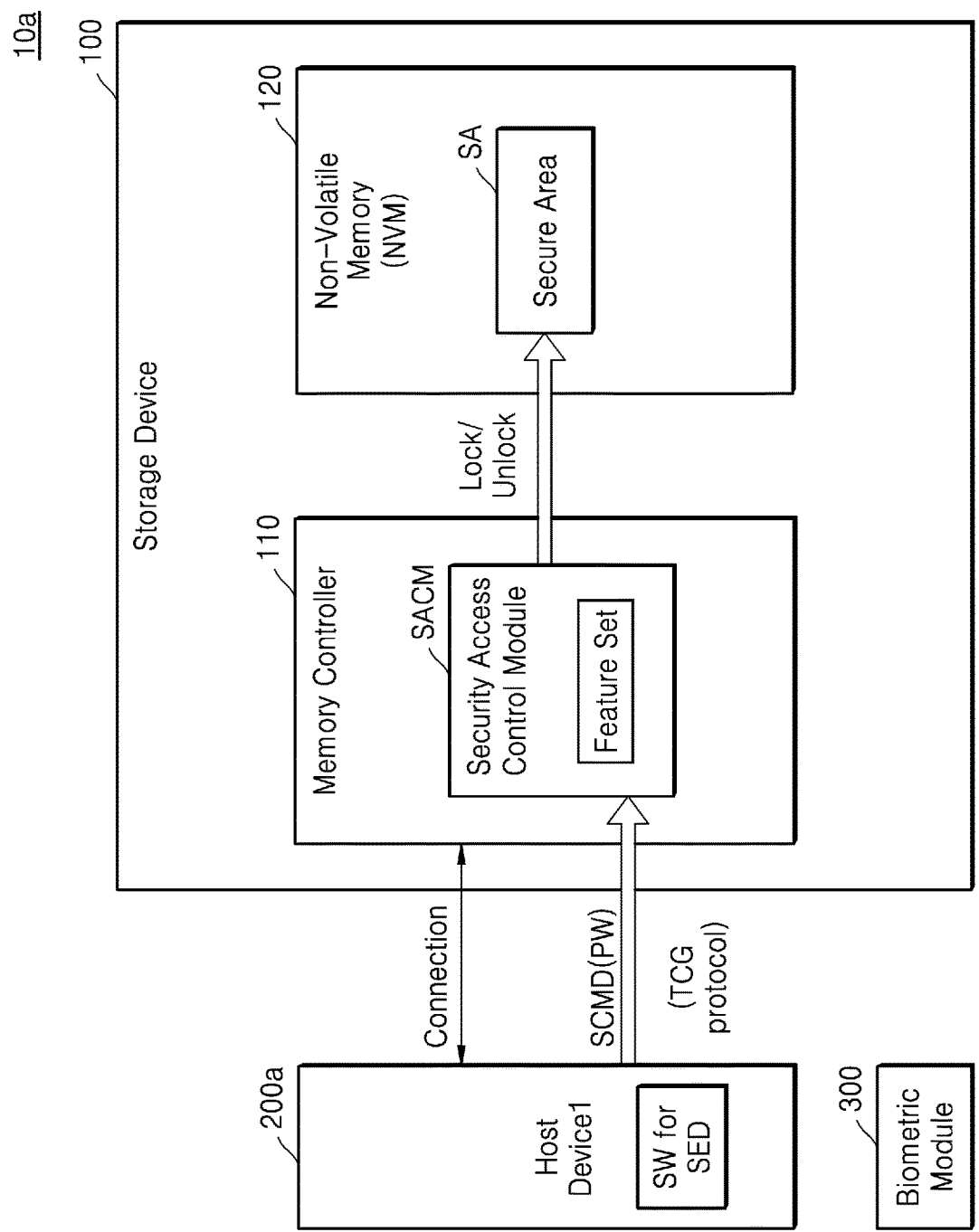
FIGS. 2A and 2B are block diagrams for describing methods of performing, by a memory controller in a storage device, user authority authentication according to a connected host device, according to example embodiments of the inventive concept.
Figure 2B:
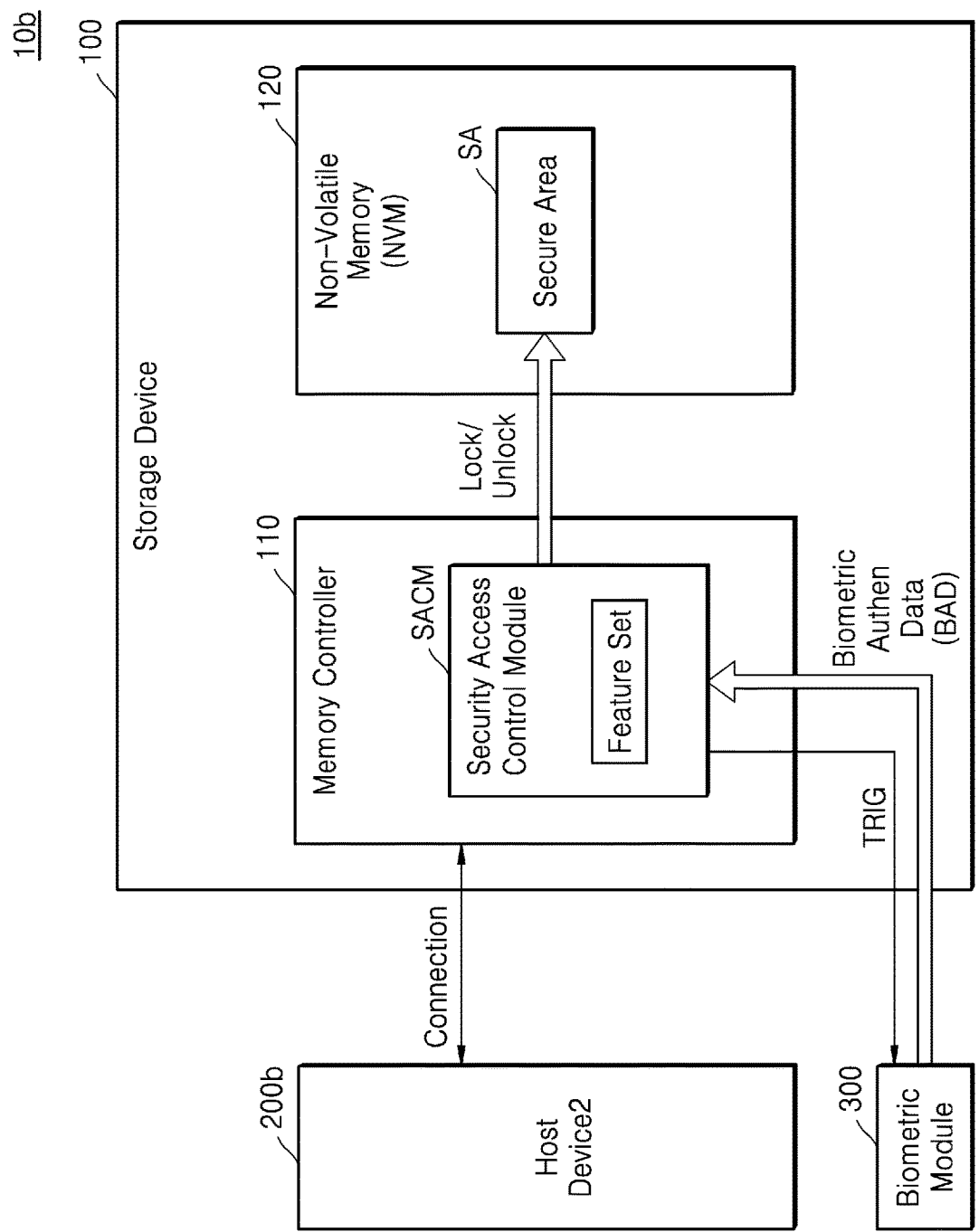

FIGS. 2A and 2B are block diagrams for describing methods of performing, by the memory controller 110 in the storage device 100, user authority authentication according to a connected host device, according to an example embodiment of the inventive concept;

Referring to FIG. 2A, in a storage system 10a, the storage device 100 may be connected to a first host device 200a, and the storage device 100 and the first host device 200a may communicate with each other according to a security standard protocol, e.g., the TCG protocol. The first host device 200a may control a configuration of the security function of the storage device 100. The first host device 200a may execute software for controlling the security function (e.g., a self-encryption function) of the storage device 100.

The first host device 200a may transmit, to the storage device 100, a security command SCMD including a user authority authentication request and a password PW for a user authority. The security access control module SACM of the memory controller 110 may perform authority authentication on the user authority, i.e., user authority authentication, based on the password PW in response to the security command SCMD. The security access control module SACM may determine that the authority authentication is successful when the received password PW is a password set as a credential value of the user authority when the user authority was registered. When the authority authentication is successful, a session with a locking security provider (SP) (e.g., SP2 of FIG. 3) may be opened. The storage device 100 may transmit, to the first host device 200a, a response RES indicating that the session is opened, and the first host device 200a may transmit, to the storage device 100, a setting value for setting the secure area SA of the NVM 120 to the lock state or the unlock state. The security access control module SACM may change the secure area SA of the NVM 120 from the lock state to the unlock state by setting a feature set according to the security standard protocol based on the received setting value. As such, the first host device 200a may provide the security command SCMD to the storage device 100, and the memory controller 110 of the storage device 100 may set the secure area SA of the NVM 120 to the lock state or the unlock state (hereinafter, referred to as the lock and/or unlock state) based on the security command SCMD received from the first host device 200a, thereby configuring the security function of the storage device 100.

Referring to FIG. 2B, in a storage system 10b, the storage device 100 may be connected to a second host device 200b, and the second host device 200b may not communicate with the storage device 100 according to a security standard protocol. In other words, the second host device 200b may not provide a security command to the storage device 100.

The security access control module SACM may perform authority authentication on a user authority based on BAD received from the biometric module 300 without control of the second host device 200b (e.g., without receiving the security command SCMD of FIG. 2A).

When the storage device 100 is connected to the second host device 200b, the security access control module SACM may transmit a trigger signal TRIG to the biometric module 300. According to an embodiment of the inventive concept, the trigger signal TRIG may be a signal for requesting the biometric module 300 to perform biometric authentication. The biometric module 300 may perform biometric authentication in response to the trigger signal TRIG. The biometric module 300 may sense the living body of a user to obtain biometric data, and perform biometric authentication based on the biometric data. When the biometric authentication is successful, the biometric module 300 may transmit, to the memory controller 110, BAD including a unique value and a biometric authentication success message. According to an embodiment of the inventive concept, the trigger signal TRIG may be a signal for requesting the biometric module 300 to obtain biometric data by sensing the living body of a user. The biometric module 300 may transmit, to the memory controller 110, the biometric data or biometric information generated based on the biometric data, as the BAD.

Figure 3:
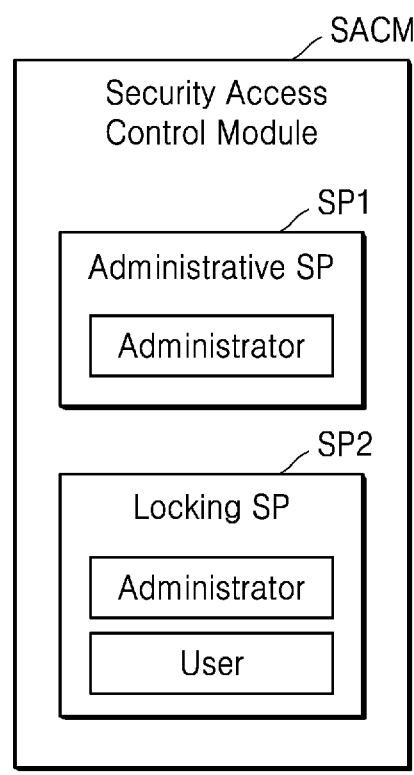
FIG. 3 illustrates management targets of a security access control module, according to an example embodiment of the inventive concept.

The security access control module SACM may independently configure the security function of the storage device 100 based on the BAD. The security access control module SACM may perform authority authentication on a user authority based on the BAD. The security access control module SACM may determine that the authority authentication is successful when the BAD includes authentication data corresponding to a credential value of the user authority, e.g., when the unique value included in the received BAD is identical to a unique value used when the credential value of the user authority was set. When the authority authentication is successful, a session with a locking SP (e.g., the SP2 of FIG. 3) may be opened. The security access control module SACM may change the secure area SA of the NVM 120 from the lock state to the unlock state through the opened session. The security access control module SACM may set the lock state or the unlock state by determining a setting value corresponding to a field value of a feature set according to the security standard protocol, which indicates the lock state or the unlock state of the secure area SA of the NVM 120. As such, the storage device 100 may configure the security function of the storage device 100 by setting the lock/unlock state of the secure area SA of the NVM 120 based on the BAD received from the biometric module 300 without control of the second host device 200b. FIG. 3 illustrates management targets of the security access control module SACM, according to an example embodiment of the inventive concept.

Referring to FIG. 3, a storage device (e.g., 100 of FIG. 1) may include a plurality of security providers (SPs), e.g., first and second SPs SP1 and SP2, and the security access control module SACM may manage the plurality of SPs, e.g., first and second SPs SP1 and SP2. The storage device 100 may include the first SP SP1 and the second SP SP2, wherein the first SP SP1 is an administrative SP, and the second SP SP2 is a locking SP. The administrative SP may control information about and a configuration of the storage device 100 and issue another SP. The locking SP may control the lock/unlock state of the secure area SA of the NVM 120. However, embodiments of the inventive concept are not limited thereto, and the number and configuration of SPs may be changed.

The first SP SP1 and the second SP SP2 may respectively include feature set tables (e.g., an authority table (ATB) of FIG. 4A and a locking table (LTB) of FIG. 4B) including feature sets associated with authority control of an administrator and/or users and control of the lock/unlock state.

The security access control module SACM may set (or change) field values of the feature sets based on a security command received from a host device (e.g., 200 of FIG. 1) according to a security standard protocol, e.g., the TCG protocol, or determine field values of the feature sets based on BAD received from a biometric module (e.g., 300 of FIG. 1) and set (or change) field values of the feature sets based on the determined filed values.

FIGS. 4A and 4B are implementation examples of feature set tables configured by a security access control module, according to an example embodiment of the inventive concept.

FIG. 4A illustrates an implementation example of an authority table (ATB), and FIG. 4B illustrates an implementation example of a locking table (LTB). Each of the ATB and the LTB may include at least one feature set including a plurality of fields (FDs) and a setting value corresponding to each of the plurality of FDs.

Referring to FIG. 4A, the plurality of FDs of the ATB may include, for example, a unique identifier field UID, a name field NM, an authority enable field EN, an operation field OP, and a credential field CRD. However, this is merely an example, and the ATB may omit or replace any of the above fields or further include other types of fields. The unique identifier field UID may indicate a setting value for identifying an object (e.g., a target of a feature set) in a corresponding table, e.g., the ATB, and an SP in which the table is included, and may indicate, for example, an 8-byte identifier. The name field NM indicates a name of the object, and in the ATB, the name of the object may indicate users, e.g., a first administrator Admin1, a first user User1, and a second user User2. The authority enable field EN indicates whether a corresponding authority is activated and may be set to true (T) or false (F). The operation field OP indicates an authentication method to be performed based on a credential, and for example, when a password is set in the operation field OP, authority authentication according to a password scheme may be performed based on a credential value set in the credential field CRD. The credential field CRD indicates authentication information for authenticating an object used together with an authority, and for example, individual identifiers of users (C_PIN_Admin1, C_PIN_User1, C_PIN_User2) may be set as credential values. As described above with reference to FIGS. 2A and 2B, a credential value may be set based on the password PW received from the first host device 200a or the unique value included in the BAD received from the biometric module 300.

Referring to FIG. 4B, a plurality of FDs of the LTB may include, for example, a unique identifier field UID, a name field NM, a range field RNG, a read/write lock enable field RWEN, a read/write lock field RWL, and the like. However, this is merely an example, and the LTB may omit or replace any of the above fields or further include other types of fields. The range field RNG indicates a range in which lock and unlock for read/write are controlled in a secure area SA of an NVM (e.g., 110 of FIG. 1), and may indicate, for example, a range of logical block addresses (LBAs) as shown in FIG. 4B. According to an embodiment of the inventive concept, a range in which read/write lock and unlock are controlled may be differently set as shown in FIG. 4B for each user, e.g., the first administrator Admin1, the first user User1, and the second user User2. However, embodiments of the inventive concept are not limited thereto, and read/write lock and unlock may be controlled with respect to the entire secure area SA for at least one user.

The read/write lock enable field RWEN indicates whether lock related to read and/or write of an object is activated, and the read/write lock field RWL indicates the lock state or the unlock state with respect to read and/or write. The read/write lock enable field RWEN and the read/write lock field RWL may be set to T or F, and when the read/write lock field RWL is set to T, a corresponding range is set to the lock state with respect to read and/or write so that access to the corresponding range for read and/or write may be blocked.

For example, in the LTB of FIG. 4B, according to setting values of a feature set in a third row, for the second user User2, with respect to a range corresponding to a fifth LBA LBA5 to an eighth LBA LBA8 in the secure area SA of the NVM 120, read/write lock is activated in response to the read/write lock enable field RWEN being set to T, and read/write is in the unlock state in response to the read/write lock field RWL being set to F.

The ATB and the LTB have been described with examples with reference to FIGS. 4A and 4B. However, tables of feature sets set by the security access control module SACM are not limited thereto, and the security access control module SACM may set various types of feature set tables based on a security standard protocol and determine field values of a feature set in an authority authentication operation.

Referring to FIG. 3, for example, when the security function of the storage device 100 is configured under control of the host device 200, the security access control module SACM may receive a security command (e.g., an authority registration security command) including a user authority registration request and setting values from the host device 200 in a user authority registration operation and set feature sets with respect to a user authority, e.g., a feature set FS1 in the ATB of FIG. 4A and a feature set FS2 in the LTB of FIG. 4B, based on the setting values. The received setting values may include, for example, respective setting values of the unique identifier field UID, the name field NM, the authority enable field EN, and the operation field OP of the feature set FS1 in the ATB of FIG. 4A and the unique identifier field UID, the name field NM, the range field RNG, the read/write lock enable field RWEN, and the read/write lock field RWL of the feature set FS2 in the LTB of FIG. 4B. In this case, the security access control module SACM may set a credential value of the credential field CRD based on a password received from the host device 200 and set the read/write lock field RWL to T. In a user authority authentication operation, the security access control module SACM may receive, from the host device 200, an authority authentication request, a setting value of the unique identifier field UID, and a password as a security command for requesting user authority authentication. The security access control module SACM may perform the user authority authentication based on the password, receive a setting value (e.g., a setting value indicating F) of the read/write lock field RWL from the host device 200 when the user authority authentication is successful, and set the read/write lock field RWL of the LTB to F based on the setting value. Accordingly, with respect to a user associated with the received password, access for read and/or write of the user to a range of the secure area SA of an NVM (e.g., a range indicated by the range field RNG) set for the user may be permitted.

When the storage device 100 independently configures the security function, the security access control module SACM may receive an authority registration command from the host device 200 (or another input and/or output device) in a user authority registration operation, receive BAD (see FIG. 1) from a biometric module (e.g., 300 of FIG. 1), determine field values of feature sets with respect to a user authority, e.g., the feature set FS1 in the ATB of FIG. 4A and the feature set FS2 in the LTB of FIG. 4B, based on the BAD, and set the feature sets based on the determined field values. In this case, the security access control module SACM may set a credential value of the credential field CRD based on the BAD received from the biometric module 300 and set the read/write lock field RWL to T. However, when a range is differently set for each user, a setting value of the range field RNG may be received from the host device 200 (or another input/output device), and the security access control module SACM may set the range field RNG based on the received setting value.

In a user authority authentication operation, the security access control module SACM may receive BAD from the biometric module, perform user authority authentication based on the BAD, and set the read/write lock field RWL of the LTB to F when the user authority authentication is successful so that, with respect to a user associated with the received BAD, access for read and/or write of the user to a range of the secure area SA set for the user may be permitted.

As described above, in the storage device according to an embodiment of the inventive concept, the security access control module SACM may set (or change) field values of feature sets according to a security standard protocol, and even when the host device 200 does not provide setting values including a password, the security access control module SACM may determine field values of feature sets according to the security standard protocol based on BAD received from the biometric module, and set (or change) the feature sets based on the determined field values.

Figure 5:
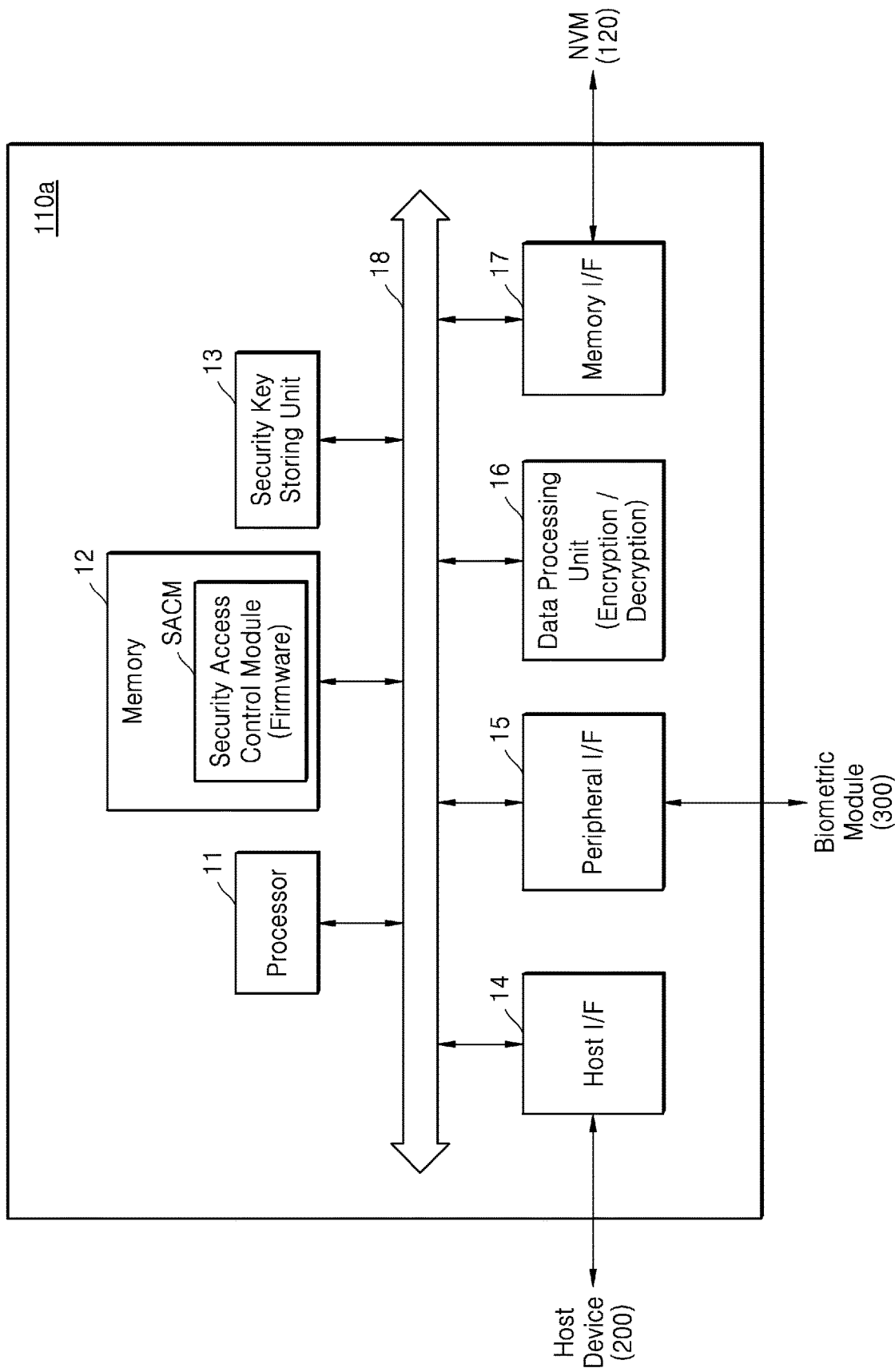
FIG. 5 is a block diagram of a memory controller according to an example embodiment of the inventive concept.

FIG. 5 is a block diagram of a memory controller 110a according to an example embodiment of the inventive concept.

Referring to FIG. 5, the memory controller 110a may include a processor 11, a memory 12, a security key storing unit 13, a host interface 14, a peripheral interface 15, a data processing unit 16, and a memory interface (hereinafter, referred to as an NVM interface) 17. According to an embodiment of the inventive concept, components of the memory controller 110a, e.g., the processor 11, the memory 12, the security key storing unit 13, the host interface 14, the peripheral interface 15, the data processing unit 16, and the NVM interface 17, may communicate with each other via a system bus 18. According to an embodiment of the inventive concept, the memory controller 110a may further include other components, e.g., read only memory (ROM), an error correction circuit, a buffer, and the like.

The processor 11 may include a central processing unit (CPU), a microprocessor, or the like and control a general operation of the memory controller 110a. According to an embodiment of the inventive concept, the processor 11 may be implemented by a multi-core processor, for example, a dual core processor or a quad core processor.

The memory 12 may be implemented by a volatile memory such as a dynamic random access memory (DRAM) or a static random access memory (SRAM) or an NVM, and firmware may be loaded onto the memory 12.

The firmware may include program code (or instructions) for implementing an operation algorithm of the security access control module SACM described above. The firmware may be stored in an NVM inside or outside the memory controller 110a, e.g., a ROM, an electrically erasable programmable read-only memory (EEPROM), a phase-change random access memory (PRAM), a flash memory, or the like or stored in the NVM 120, and loaded onto the memory 12 when a storage device (e.g., 100 of FIG. 1) is powered on. When the processor 11 executes the firmware, e.g., the security access control module SACM, loaded onto the memory, the security function of the storage device 100 may be performed. For example, the security access control module SACM may encrypt or decrypt a security key, and the security key storing unit 13 may store the encrypted security key.

According to an embodiment of the inventive concept, when a plurality of user authorities are registered, a plurality of encrypted security keys encrypted based on a plurality of unique values or a plurality of passwords corresponding to the plurality of user authorities, respectively, may be stored. The security key storing unit 13 may be implemented by an NVM such as a register, a PRAM, or a flash memory.

The host interface 14 may provide an interface between the host device 200 and the memory controller 110a, and for example, the host interface 14 may be implemented by one of various interfaces such as a universal serial bus (USB) interface, a universal flash storage (USF) interface, a multimedia controller (MMC) interface, an embedded MMC (eMMC) interface, a peripheral component interconnect express (PCIe) interface, an advanced technology attachment (ATA) interface, a serial advanced technology attachment (SATA) interface, a parallel advanced technology attachment (PATA) interface, a small computer system interface (SCSI), a serial attached SCSI (SAS), an enhanced small disk interface (ESDI), and an integrated drive electronics (IDE) interface.

The peripheral interface 15 may provide an interface between the memory controller 110a and the biometric module 300. For example, the peripheral interface 15 may provide a communication interface such as a universal asynchronous receiver transmitter (UART) interface, an inter integrated circuit (I2C) interface, a serial peripheral interface (SPI), a mobile industry processor interface (MIPI), or an embedded display port (eDP) interface.

The peripheral interface 15 may transmit a trigger signal (e.g., a biometric authentication trigger signal or a biometric registration trigger signal) for operating the biometric module 300. In addition, the peripheral interface 15 may receive a biometric authentication message and a unique value from the biometric module 300. For example, a biometric information registration message or a biometric authentication result (e.g., biometric authentication success or biometric authentication failure) message may be received as the biometric authentication message.

The data processing unit 16 may encrypt or decrypt user data. The data processing unit 16 may encrypt or decrypt the user data based on a security key. The data processing unit 16 may encrypt the user data received from the host device 200, based on the security key. For example, the data processing unit 16 may scramble the user data based on the security key. The encrypted user data may be stored in the NVM 120. The data processing unit 16 may decrypt the encrypted user data read from the NVM 120, based on the security key. For example, the data processing unit 16 may descramble the encrypted user data based on the security key. The decrypted user data may be transmitted to the host device 200.

The NVM interface 17 may provide an interface between the memory controller 110a and the NVM 120. Encrypted user data may be transmitted and received between the memory controller 110a and the NVM 120 through the NVM interface 17. According to an embodiment of the inventive concept, the number of NVM interfaces 17 may correspond to the number of NVM chips included in the storage device 100 or the number of channels between the memory controller 110a and the NVM 120.

Figure 6:
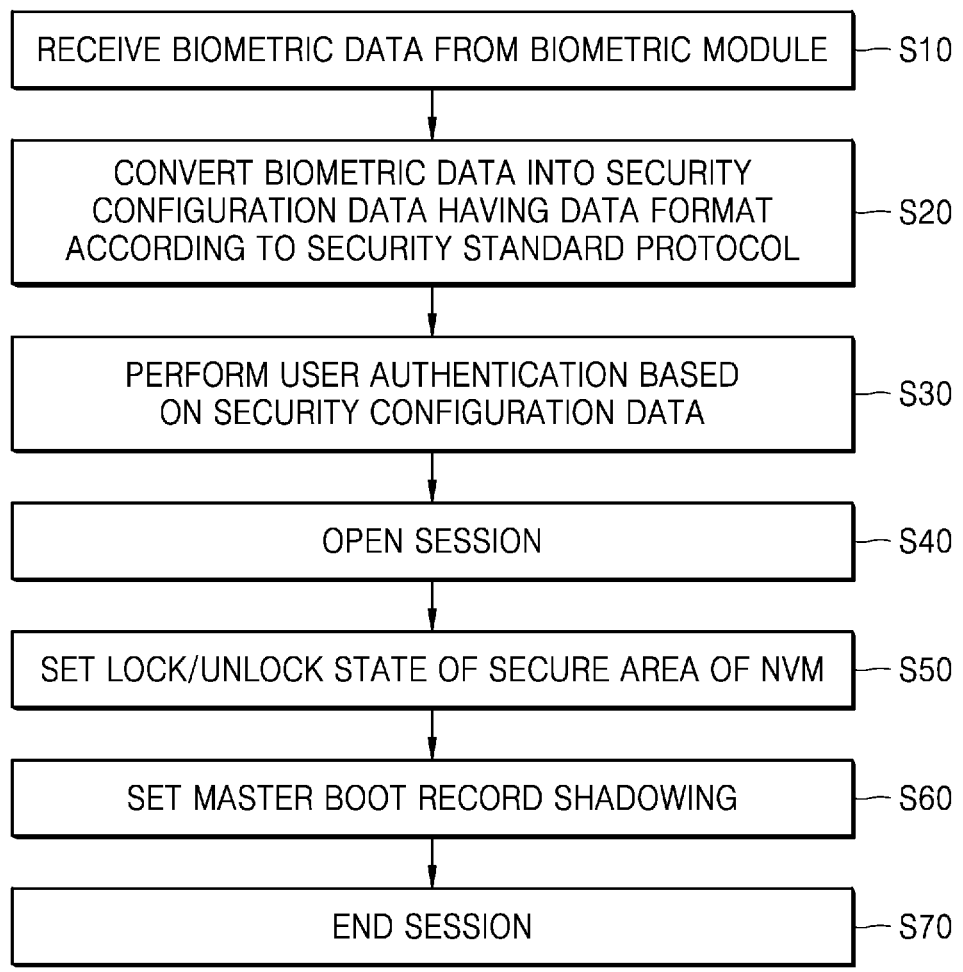
FIG. 6 is a flowchart of a method of operating a storage device based on received biometric authentication data, according to an example embodiment of the inventive concept.

FIG. 6 is a flowchart of a method of operating a storage device based on received biometric authentication data, according to an example embodiment of the inventive concept, and FIG. 7 illustrates an example of a data format according to a security standard protocol.

The operating method of FIG. 6 may be performed by the storage device 100 of FIG. 1, and the description made above with respect to the storage device 100 may be applied to embodiment of FIG. 6.

Referring to FIGS. 1 and 6, the storage device 100 may receive BAD from the biometric module 300 in operation S10. The BAD may include biometric data generated by sensing the living body of a user, or biometric information generated based on the biometric data. Alternatively, the BAD may include a unique value and a biometric authentication result according to the biometric information.

The storage device 100 may convert the BAD into security configuration data (e.g., SCSD of FIG. 7) according to a security standard protocol in operation S20. The security configuration data may have the same data format as a security command which is receivable from the host device 200. The security access control module SACM of the memory controller 110 may function as a parser to generate the security configuration data SCSD based on the BAD.

Referring to FIG. 7, a data format according to the security standard protocol, e.g., the TCG protocol, may have a data block including a plurality of bytes. For example, the data format according to the TCG protocol may include 16 rows R (e.g., 0000 to 01F0 represented by hexadecimal numbers), and each row may include 16-byte data. Therefore, the security configuration data SCSD and a security command may include a 512-byte data block (or a data packet). The meaning (or purpose) of each of single-byte or multi-byte data values included in each row is defined by the security standard protocol and may indicate a field value of a feature set according to the security standard protocol.

For example, when the security configuration data SCSD corresponds to a security command for requesting a session open of a locking SP, the security access control module SACM may set, as a password according to the security standard protocol, a data value of total 17 bytes, i.e., "3C 41 64 6D 69 6E 31 5F 70 61 73 73 77 6F 72 64 3E", including five least significant bytes (or five bytes at the right side) of a sixth row (0050) and 12 most significant bytes (or 12 bytes at the left side) of a seventh row (0060) based on the unique value of the BAD.

Referring back to FIG. 6, the storage device 100 may perform user authentication based on the security configuration data SCSD in operation S30. The security access control module SACM may determine that authority authentication is successful when the password of the security configuration data SCSD is identical to a credential value of a user authority set when the user authority was registered. The storage device 100 may open a session in operation S40. For example, when the authority authentication on the user authority is successful, the security access control module SACM may open (or start) a session with the locking SP.

The storage device 100 may set the lock/unlock state of the secure area SA of the NVM 120 in operation S50. For example, the security access control module SACM may set the lock/unlock state by determining a field value (or setting value) of the read/write lock field RWL through the session.

The storage device 100 may set master boot record shadowing in operation S60. For example, through the session, the security access control module SACM may set a master boot record table so as to read a master boot record included in the secure area SA (herein referred to as master boot record unshadowing) or set the master boot record table so as to read a master boot record included in a non-secure area (herein referred to as master boot record shadowing).

For example, the security access control module SACM may set the storage device 100 to the unlock state by setting the setting value of the read/write lock field RWL to F in operation S50 and setting, in operation S60, the master boot record table so as to read a master boot record included in the secure area SA.

The storage device 100 may end the session in operation S70. The security access control module SACM may configure the security function, e.g., set the storage device 100 to the unlock state, and then end the session.

Figure 8A:
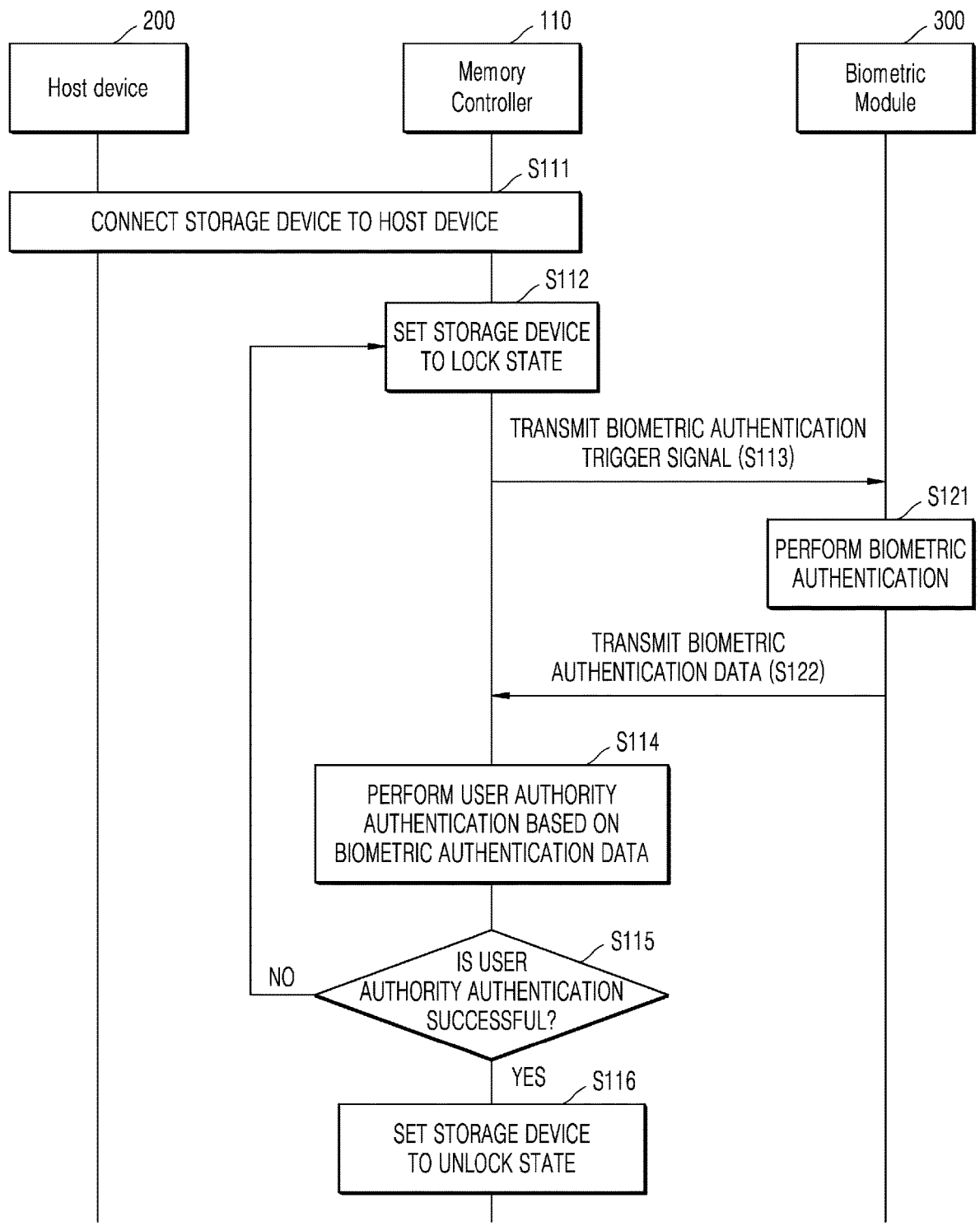
FIGS. 8A and 8B are diagrams illustrating user authority authentication methods of a storage system, according to example embodiments of the inventive concept.
Figure 8B:
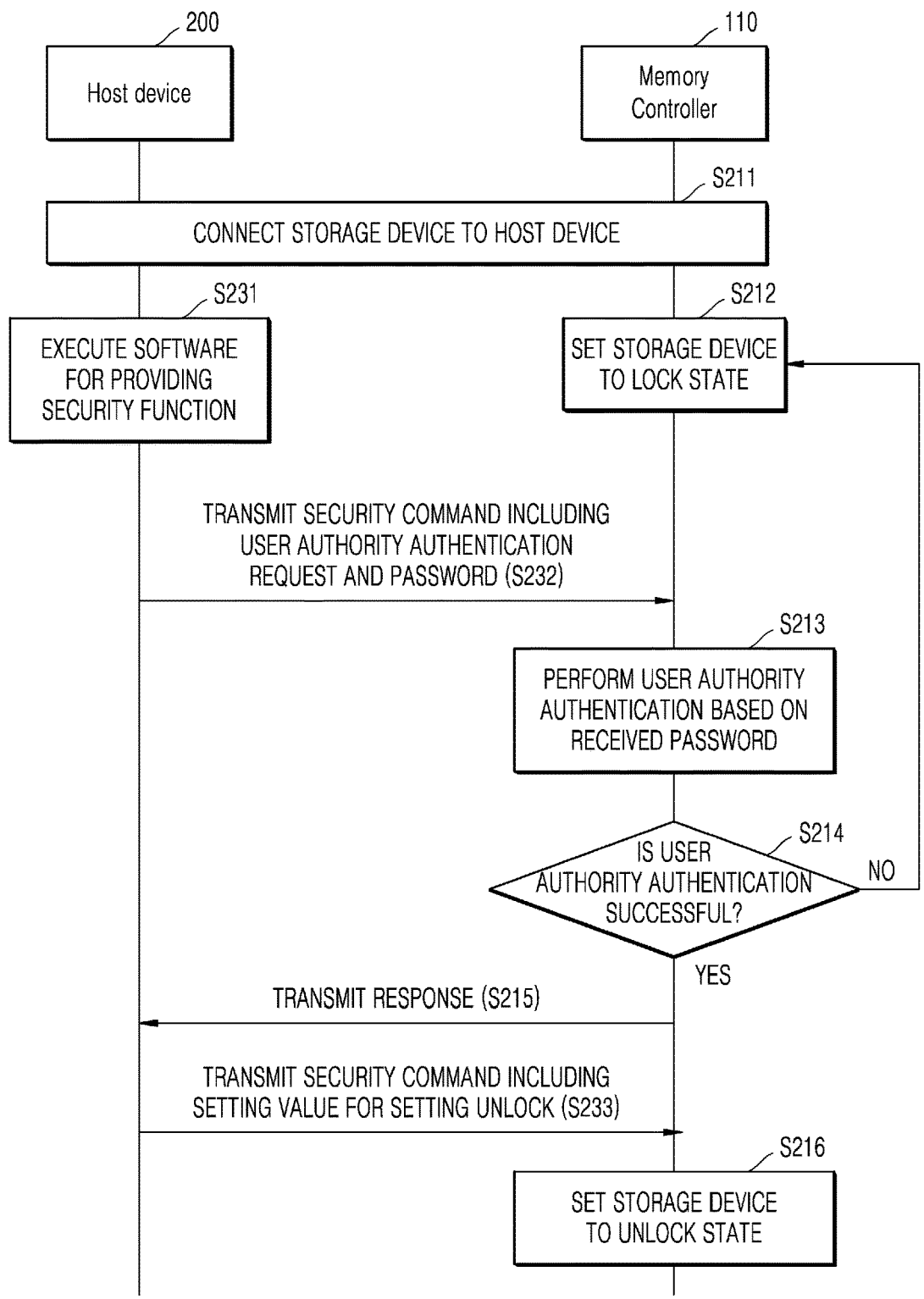

FIGS. 8A and 8B are diagrams of user authority authentication methods of a storage system, according to example embodiments of the inventive concept.

FIG. 8A shows a case where the memory controller 110 included in a storage device (e.g., 100 of FIG. 1) configures a security function by independently performing user authority authentication without control of the host device 200, and FIG. 8B shows a case where the memory controller 110 configures the security function by performing user authority authentication under control of the host device 200. For example, the host device 200b of FIG. 2B may operate as the host device 200 of FIG. 8A, and the host device 200a of FIG. 2A may operate as the host device 200 of FIG. 8B.

Referring to FIG. 8A, the storage device 100 is connected (or linked) to the host device 200 in operation S111, and in this case, the storage device 100 may be set to the lock state in operation S112. When the storage device 100 is disconnected from the host device 200 or is powered off, the storage device 100 may be set to the lock state, and thereafter, even when the storage device 100 is connected to the host device 200 as in operation S111, the storage device 100 may maintain the lock state. When the storage device 100 is in the lock state, the memory controller 110 may set a read and/or write state as the lock state with respect to the secure area SA of the NVM 120 and provide information about a non-secure area (e.g., a shadow master boot record) to the host device 200. For example, the memory controller 110 may set the read and/or write state as the lock state with respect to the secure area SA of the NVM 120 by setting a field value of the read/write lock field RWL in the LTB of FIG. 4B to T and set a value of a master boot record table so as to indicate the shadow master boot record stored in the non-secure area. The host device 200 may access the non-secure area based on the shadow master boot record.

In operation S113, the memory controller 110 may transmit, to the biometric module 300, a biometric authentication trigger signal for requesting biometric authentication. When the storage device 100 is connected to the host device 200, the memory controller 110 may automatically transmit the biometric authentication trigger signal to the biometric module 300, in other words, regardless of control of the host device 200.

The biometric module 300 may perform biometric authentication in response to the biometric authentication trigger signal in operation S121. The biometric module 300 may obtain biometric data by sensing the living body of a user. According to an embodiment of the inventive concept, the biometric module 300 may generate biometric information based on the biometric data and determine that the biometric authentication is successful when the biometric information is matched with pre-stored biometric information.

The biometric module 300 may transmit BAD to the memory controller 110 in operation S122. The biometric data (or the biometric information) of the user may be transmitted to the memory controller 110 as the BAD, or a unique value generated based on the biometric information and a biometric authentication success message may be transmitted to the memory controller 110 as the BAD. For example, as described in operation S121, in a case where whether biometric authentication is successful is determined based on whether the biometric information generated based on the biometric data obtained by the biometric module 300 is matched with pre-stored biometric information, the unique value and the biometric authentication success message may be transmitted to the memory controller 110 as the BAD.

The memory controller 110 may perform user authority authentication based on the biometric data in operation S114. For example, the memory controller 110 may perform the user authority authentication based on the unique value. As described with reference to FIG. 6, the memory controller 110 may generate security configuration data having a data format according to a security standard protocol based on BAD, e.g., a unique value, and perform user authority authentication based on the security configuration data.

In operation S115, the memory controller 110 may determine whether the user authority authentication is successful. The memory controller 110 may determine that the user authority authentication is successful when a password of the security configuration data generated based on the BAD is identical to a credential value of a user authority set when the user authority was registered. In this case, the password of the security configuration data may be a hash value of the unique value of the BAD.

When the user authority authentication is successful (pass), the memory controller 110 may set the storage device 100 to the unlock state in operation S116. The memory controller 110 may set a read and/or write state as the unlock state with respect to the secure area SA of the NVM 120 and provide information about the secure area SA to the host device 200. For example, the memory controller 110 may set the read and/or write state as the unlock state with respect to the secure area SA (or a certain range corresponding to the unique value in the secure area SA) of the NVM 120 by setting a field value of the read/write lock field RWL in the LTB of FIG. 4B to F and set a value of a master boot record table so as to indicate a master boot record stored in the secure area SA. The host device 200 may access the secure area SA of the NVM 120 based on the master boot record. The host device 200 may transmit, to the memory controller 110, a command for requesting write or read with respect to the secure area SA on which the user authority authentication has been performed, and the memory controller 110 may encrypt, based on a security key, user data to be stored in the secure area SA and store the encrypted user data, or decrypt the encrypted user data read from the secure area SA based on the security key and transmit the decrypted user data to the host device 200.

According to an embodiment of the inventive concept, when the storage device 100 is changed from the lock state to the unlock state, relink between the host device 200 and the storage device 100 may be performed, and thereafter, the host device 200 may access the secure area SA of the NVM 120.

When the user authority authentication fails, the storage device 100 may be set to the lock state in operation S112. In other words, the storage device 100 may maintain the lock state, and the host device 200 may access the non-secure area of the NVM 120 but may not access the secure area SA of the NVM 120.

Referring to FIG. 8B, a storage device (e.g., 100 of FIG. 1) is connected to the host device 200 in operation S211, and in this case, the storage device 100 may be set to the lock state in operation S212.

In operation S231, the host device 200 may execute software for providing the security function of the storage device 100. For example, an operating system of the host device 200 may execute self-encrypting drive (SED) support software for the storage device 100. Accordingly, the host device 200 may communicate with the storage device 100 according to a security standard protocol.

In operation S232, the host device 200 may transmit a security command including a user authority authentication request and a password to the memory controller 110. The security command may be defined by the security standard protocol, and the password may have a value generated by a user input. For example, the security command may be a command for requesting session open according to the security standard protocol. The security command may include a 512-byte data block (or data packet).

In operation S213, the memory controller 110 may perform user authority authentication based on the password received from the host device 200. In operation S214, the memory controller 110 may determine whether the user authority authentication is successful. The memory controller 110 may determine whether the received password is identical to a password used when a credential value for a user authority was set.

When the user authority authentication is successful (pass), the memory controller 110 may transmit a response corresponding to the security command to the host device 200 in operation S215. For example, the response may indicate that a session is opened.

In operation S233, the host device 200 may transmit, to the memory controller 110, a security command including a setting value for setting the storage device 100 to the unlock state. In operation S216, the memory controller 110 may set the storage device 100 to the unlock state based on the received security command. When the user authority authentication fails, the storage device 100 may be set to the lock state in operation S212. In other words, the storage device 100 may maintain the lock state.

As described with reference to FIGS. 8A and 8B, when the storage device 100 is connected to the host device 200, the memory controller 110 may convert BAD from the biometric module 300 into security configuration data having a data format according to the security standard protocol and perform user authority authentication without control of the host device 200. Alternatively, the memory controller 110 may perform user authority authentication based on a security command from the host device 200. As such, the storage device 100 may set the security function by performing user authority authentication under control of the host device 200 and also independently set the security function without control of the host device 200 by performing user authority authentication based on BAD from the biometric module 300, and thus, the usability of the security function of the storage device 100 may be increased.

Figure 9:
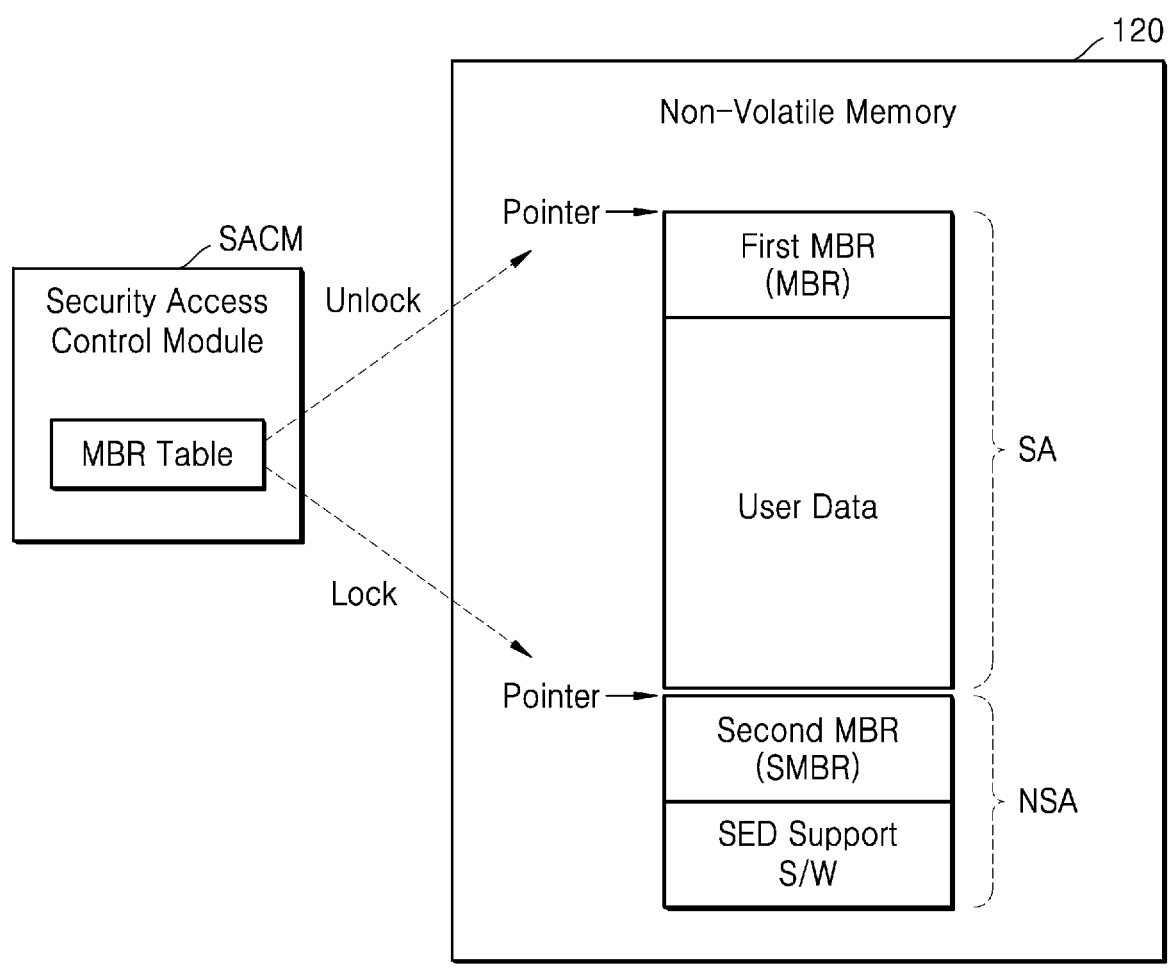
FIG. 9 illustrates a method of setting, performed by a security access control module, a lock state and an unlock state of a nonvolatile memory, according to an example embodiment of the inventive concept.

FIG. 9 illustrates a method of setting, performed by the security access control module SACM, the lock state and the unlock state of the NVM 120, according to an example embodiment of the inventive concept. FIG. 9 shows a method of setting, performed by the security access control module SACM, the lock state and the unlock state by setting master boot shadowing.

Referring to FIG. 9, the NVM 120 may include the secure area SA and a non-secure area NSA. The secure area SA is an area in which encrypted user data is stored and may be referred to as a user area. The secure area SA may be divided into a plurality of user areas (e.g., a plurality of partitions or volumes). The non-secure area NSA is a preset certain area and may be referred to as, for example, a reserved area. According to an embodiment of the inventive concept, each of the secure area SA and the non-secure area NSA may have a plurality of ranges set based on LBA In each of the secure area SA and the non-secure area NSA, a master boot record (MBR) including information about a corresponding area (e.g., partition or volume information, boot code for booting, and the like) may be stored. According to an embodiment of the inventive concept, the MBR may indicate a first MBR stored in the secure area SA, and a shadow MBR (SMBR) may indicate a second MBR stored in the non-secure area NSA.

The secure area SA may be accessible when the secure area SA is set to the unlock state after user authority authentication is successful, and the non-secure area NSA may be accessible regardless of user authority authentication. In an initial state in which the storage device 100 is connected to the host device 200, i.e., before user authority authentication is performed, the NVM may be in the lock state, and the security access control module SACM may set an MBR table so that the SMBR in the non-secure area NSA is read. For example, a setting value in the MBR table may indicate a location of a pointer of the NVM 120, and the pointer in the lock state may indicate an LBA at which the SMBR is stored. Accordingly, the SMBR may be loaded onto a memory controller (110 of FIG. 1), and the host device 200 may read data stored in the non-secure area NSA, based on information included in the SMBR. For example, in the non-secure area NSA, the SMBR and software (e.g., software supporting a user configuration or SED support software) may be stored.

When the user authority authentication is successful, the secure area SA may be set to the unlock state, and the security access control module SACM may set the MBR table so that the MBR in the secure area SA is read. For example, the pointer may indicate an LBA at which the MBR is stored, according to a setting value in the MBR table. Accordingly, the MBR may be loaded onto the memory controller 110, and the host device 200 may read data, e.g., the user data, stored in the secure area SA, based on information included in the MBR.

Figure 10A:
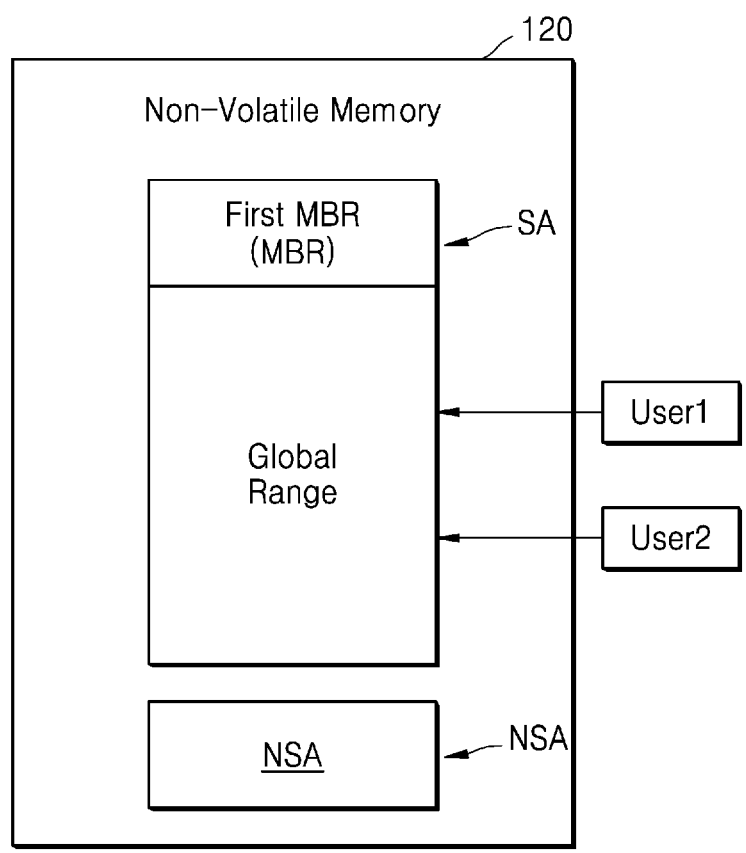
FIGS. 10A and 10B illustrate a plurality of user authorities accessible to a secure area of a nonvolatile memory, according to example embodiments of the inventive concept.
Figure 10B:
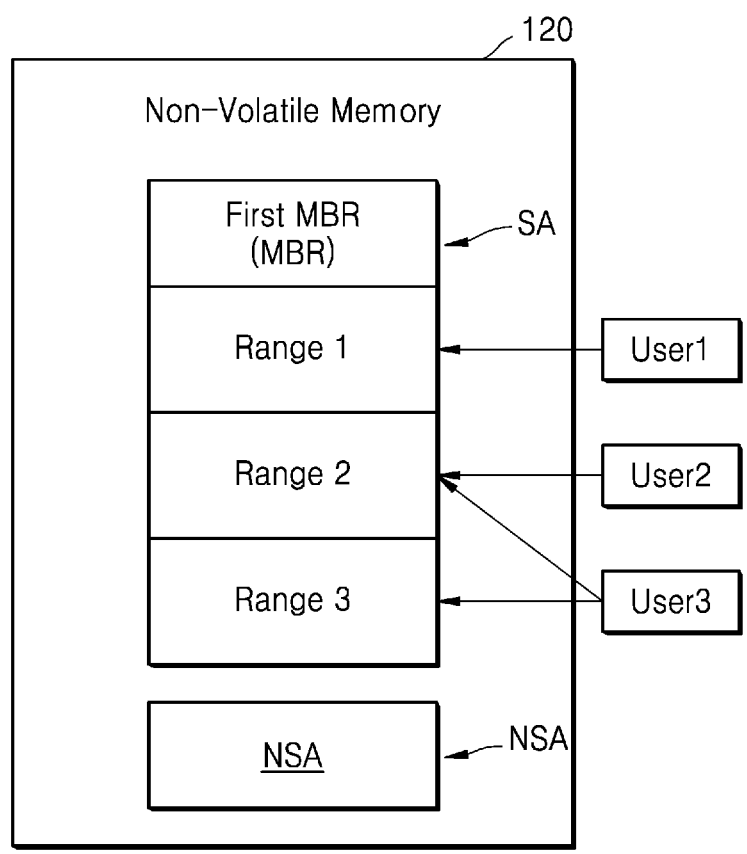

FIGS. 10A and 10B illustrate a plurality of user authorities accessible to the secure area SA of the NVM 120, according to example embodiments of the inventive concept.

Referring to FIGS. 10A and 10B, the secure area SA of the NVM 120 may be accessed by a plurality of users for whom a user authority is set, and an area to which each user is accessible may be uniformly or differently set.

Referring to FIG. 10A, a first user User1 and a second user User2 may have a user authority accessible to the entire secure area SA, e.g., a global range. When user authority authentication on the first user User1 or the second user User2 is successful, e.g., when authority authentication is successful based on BAD of the first user User1 or the second user User2, read and/or write with respect to the entire secure area SA are set to the unlock state, and in response to a request of a host device (200 of FIG. 1), a memory controller (110 of FIG. 1) may access the secure area SA for read and/or write.

Referring to FIG. 10B, the first user User1 may have a user authority accessible to a first range Range1, the second user User2 may have a user authority accessible to a second range Range2, and a third user User3 may have a user authority accessible to the second range Range2 and a third range Range3. When user authority authentication on the first user User1 is successful, read and/or write of the first user User1 with respect to the first range Range1 may be set to the unlock state, when user authority authentication on the second user User2 is successful, read and/or write of the second user User2 with respect to the second range Range2 may be set to the unlock state, and when user authority authentication on the third user User3 is successful, read and/or write of the third user User3 with respect to the second and third ranges Range2 and Range3 may be set to the unlock state.

Figure 11:
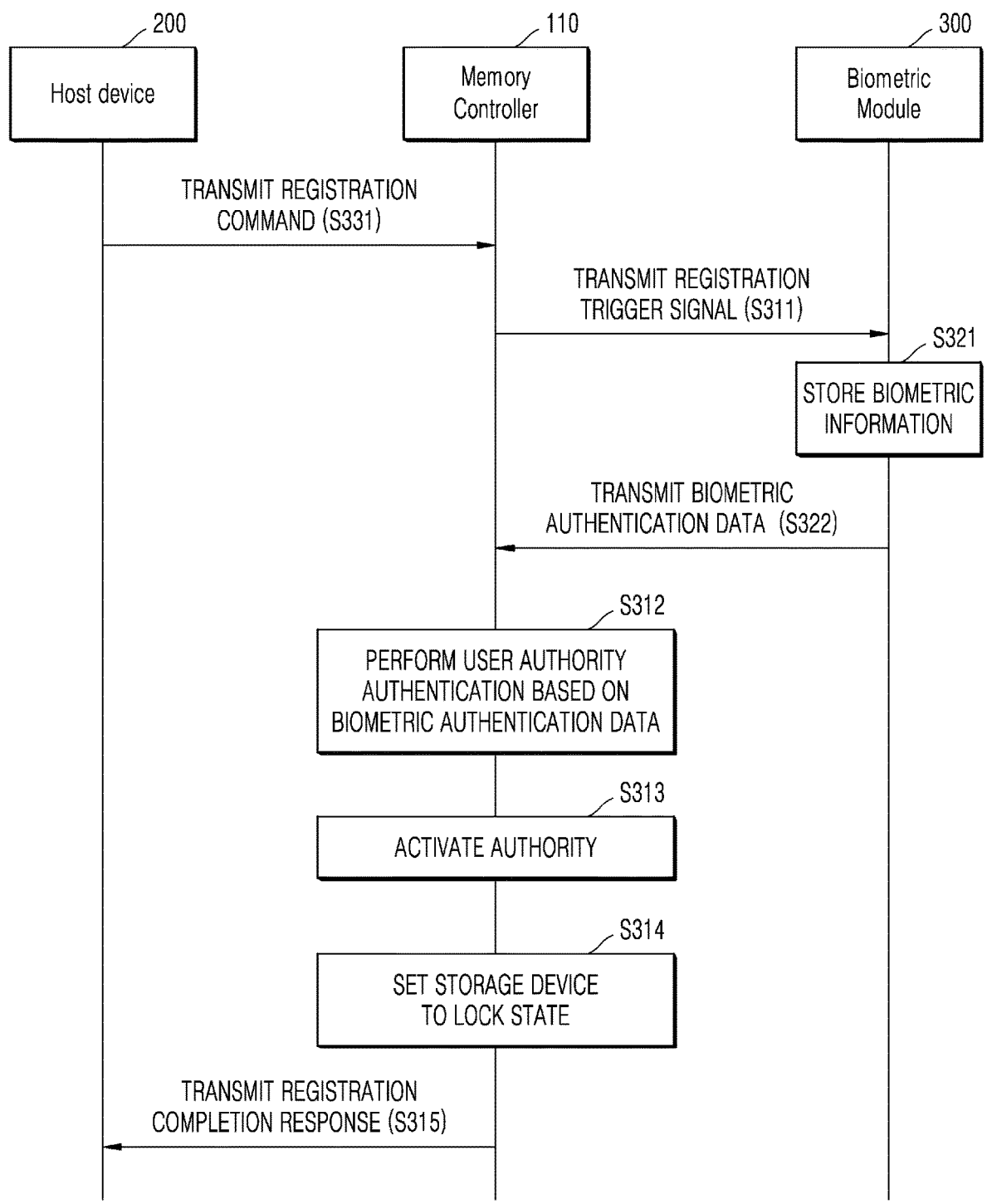
FIG. 11 is a diagram of a user authority registration method of a storage system, according to an example embodiment of the inventive concept.

FIG. 11 is a diagram of a user authority registration method of a storage system, according to an example embodiment of the inventive concept. The method of FIG. 11 is to register a user authority based on BAD and may be performed by the storage system 10 of FIG. 1. FIG. 11 will be described with reference to FIG. 1 together.

Referring to FIG. 11, in operation S331, the host device 200 may transmit, to the memory controller 110, a registration command for requesting user authority registration. In operation S311, the memory controller 110 may transmit a registration trigger signal for requesting biometric information registration to the biometric module 300 in response to the registration command.

In operation S321, the biometric module 300 may store biometric information of a user. In response to the registration trigger signal, the biometric module 300 may obtain biometric data by sensing the living body of the user and generate the biometric information based on the biometric data. The biometric module 300 may register the biometric information of the user by storing the biometric information. In other words, the biometric module 300 may manage the biometric information of the user.

In operation S322, the biometric module 300 may transmit BAD to the memory controller 110. The biometric module 300 may transmit, as the BAD, a message indicating biometric information registration completion and a unique value according to the biometric information (e.g., a hashing value of the biometric information).

In operation S312, the memory controller 110 may set a user authority based on the BAD. As described with reference to FIG. 3, the security access control module SACM may determine field values of feature sets with respect to a user authority, e.g., the feature set FS1 in the ATB of FIG. 4A and the feature set FS2 in the LTB of FIG. 4B, based on the BAD, and set the feature sets based on the determined values. For example, the security access control module SACM may set a name of the user authority and set a credential value for the user authority based on a unique value of the BAD. According to an embodiment of the inventive concept, the security access control module SACM may generate security configuration data having a data format according to a security standard protocol based on the BAD and set the user authority based on the security configuration data.

In operation S313, the memory controller 110 may activate the user authority. For example, the security access control module SACM may activate the user authority by setting the authority enable field EN in the ATB to T. In operation S314, the memory controller 110 may set the storage device 100 to the lock state. For example, the security access control module SACM may set the read/write lock field RWL in the LTB to T. In operation S315, the memory controller 110 may transmit a registration completion response to the host device 200. Accordingly, the user authority registration may be completed.

However, although it has been described in operation S321 that the biometric module 300 stores the biometric information of the user, embodiments of the inventive concept are not limited thereto, and according to an embodiment of the inventive concept, the biometric module 300 may obtain biometric data by sensing the living body of the user and transmit the biometric data to the memory controller 110 as the BAD. The biometric module 300 stores neither the biometric data nor biometric information. In this case, the biometric module 300 only performs a function of obtaining the biometric data of the user, and the memory controller 110 may generate biometric information based on the biometric data and store the biometric information. In other words, the memory controller 110 may register and manage the biometric information of the user. The memory controller 110 may generate a unique value according to the generated biometric information and set a credential value based on the unique value.

Although it is shown in an example embodiment of FIG. 11 that the memory controller 110 performs user authority registration in response to a request from the host device 200, example embodiments of the inventive concept are not limited thereto, and according to an embodiment of the inventive concept, the memory controller 110 may perform user authority registration in response to a request from an input/output device included in the storage system 10 instead of the host device 200. For example, the storage device 100 may include an input/output device having a user interface, and in operation S331, the memory controller 110 may receive a signal for requesting user authority registration from the input/output device instead of the host device 200, and in addition, in operation S315, the memory controller 110 may transmit a registration completion response to the input/output device.

Figure 12:
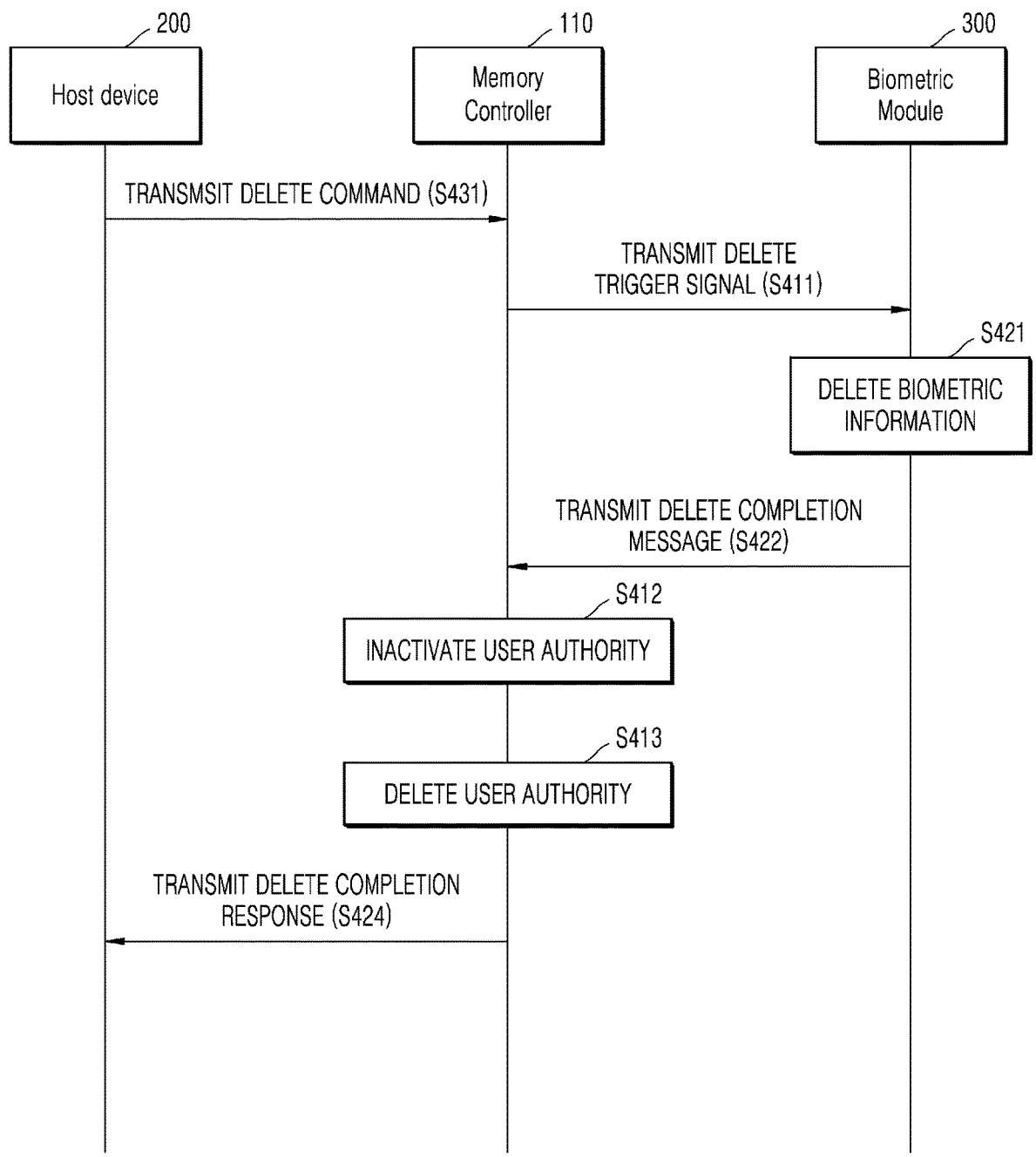
FIG. 12 is a diagram of a user authority delete method of a storage system, according to an example embodiment of the inventive concept.

FIG. 12 is a diagram of a user authority delete method of a storage system, according to an example embodiment of the inventive concept. The method of FIG. 12 is to delete a user authority and may be performed by the storage system 10 of FIG. 1. FIG. 12 will be described with reference to FIG. 1 together.

Referring to FIG. 12, in operation S431, the host device 200 may transmit, to the memory controller 110, a delete command for requesting deletion of a user authority. In operation S411, the memory controller 110 may transmit a delete trigger signal for requesting deletion of biometric information (or biometric data) to the biometric module 300 in response to the delete command. When the biometric module 300 stores a plurality of pieces of biometric information, the delete command transmitted from the host device 200 to the memory controller 110 may include an index indicating biometric information to be deleted, and the memory controller 110 may transmit the index to the biometric module 300 together with the delete trigger signal.

In operation S421, the biometric module 300 may delete stored biometric information in response to the delete trigger signal. The biometric module 300 may delete biometric information indicated by the index among the plurality of pieces of biometric information. In operation S422, the biometric module 300 may transmit a delete completion message to the memory controller 110.

In operation S412, the memory controller 110 may inactivate the user authority. For example, the security access control module SACM may inactivate the user authority by setting the authority enable field EN in the ATB to F. In operation S413, the memory controller 110 may delete the user authority by deleting a name of the user authority. In operation S424, the memory controller 110 may transmit a delete completion response to the host device 200. Accordingly, the user authority delete may be completed.

Although it is shown in an example embodiment of FIG. 12 that the memory controller 110 performs user authority delete in response to a request from the host device 200, example embodiments of the inventive concept are not limited thereto, and according to an embodiment of the inventive concept, the memory controller 110 may perform user authority delete in response to a request from an input/output device included in the storage system 10 instead of the host device 200 and transmit a user authority delete completion response to the input/output device.

Figure 13:
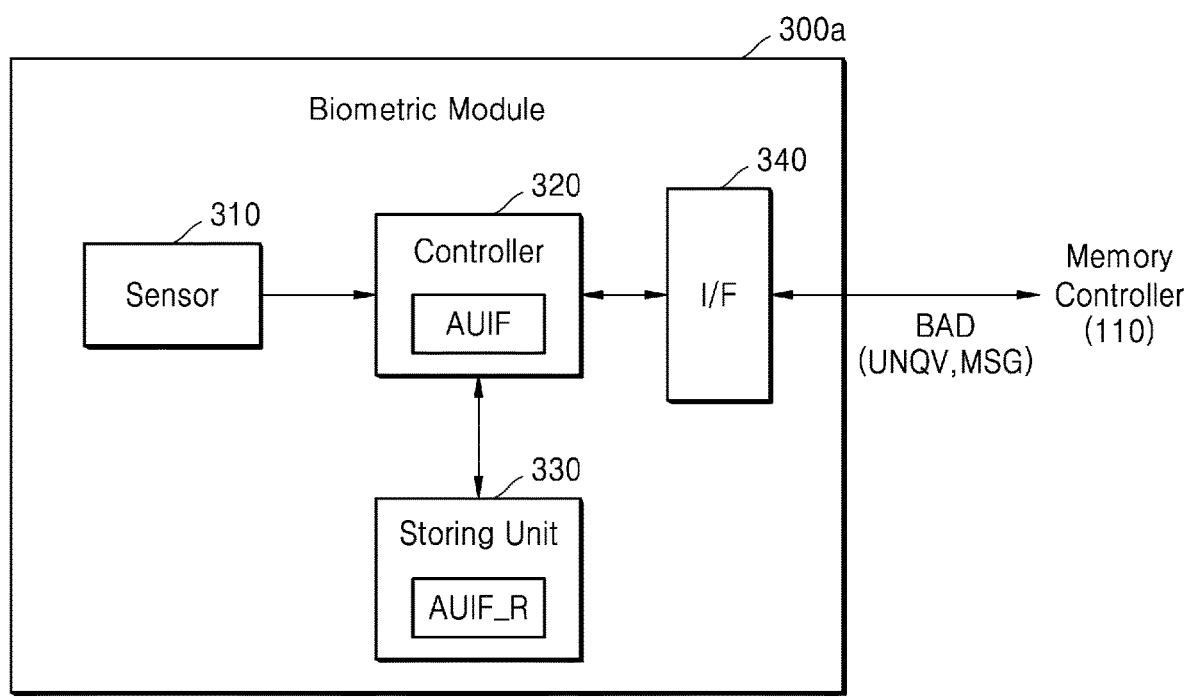
FIG. 13 is a block diagram of a biometric module according to an example embodiment of the inventive concept.

FIG. 13 is a block diagram of a biometric module 300a according to an example embodiment of the inventive concept.

Referring to FIG. 13, the biometric module 300a may include a sensor 310, a controller 320, a storing unit 330, and an interface 340.

The sensor 310 may obtain biometric data by sensing the living body of a user. For example, when the sensor 310 is implemented by a fingerprint sensor, the fingerprint sensor may generate (or obtain) a fingerprint image by sensing a fingerprint of a finger of the user. The sensor 310 may obtain biometric data of the user when a trigger signal, e.g., a biometric authentication trigger signal or a biometric registration trigger signal, is received from the memory controller 110.

The controller 320 may generate and manage biometric information AUIF. The controller 320 may store, manage and, delete the biometric information AUIF. In addition, the controller 320 may perform biometric authentication. The controller 320 may convert the biometric data into template data based on a set data format, i.e., the biometric information AUIF. In a user authority registration operation of a storage device (e.g., 100 of FIG. 1), the controller 320 may register the biometric information AUIF by storing the biometric information AUIF in the storing unit 330 as biometric information AUIF_R.

The storing unit 330 may be implemented by an NVM and may maintain the stored biometric information AUIF_R even when power applied to the biometric module 300a is blocked. When biometric information registration is performed for a plurality of users, the storing unit 330 may store biometric information AUIF_R for each of the plurality of users.

When user authority authentication is performed, the controller 320 may perform biometric authentication based on the biometric information AUIF generated by sensing the living body of the user, and transmit, when the biometric authentication is successful, BAD based on the biometric information AUIF to the memory controller 110. The controller 320 may determine whether the biometric information AUIF is matched with the biometric information AUIF_R stored in the storing unit 330 by comparing the biometric information AUIF with the biometric information AUIF_R and determine, when the biometric information AUIF is matched with one piece of the stored biometric information AUIF_R, that biometric authentication is successful.

The controller 320 may also generate a unique value UNQV based on the biometric information AUIF. For example, the controller 320 may generate the unique value UNQV by encoding the biometric information AUIF. The unique value UNQV may have a data format which is recognizable by both the biometric module 300a and the memory controller 110, and for example, the unique value UNQV may include tens-byte hash data.

When a trigger signal for requesting biometric information delete is received from the memory controller 110, the controller 320 may delete biometric data of a user. According to an embodiment of the inventive concept, when a plurality of pieces of biometric information AUIF_R are stored in the storing unit 330, the controller 320 may delete a corresponding piece of biometric information AUIF_R based on an index, which is received with the trigger signal and indicates a piece of biometric information AUIF_R to be deleted.

The controller 320 may be implemented by a combination of a processor such as a micro control unit (MCU) or a central processing unit (CPU) and firmware or a hardware logic such as a field programmable gate array (FPGA).

The interface 340 may receive a trigger signal, e.g., a biometric information registration trigger signal or a biometric authentication trigger signal, from the memory controller 110 and transmit a biometric authentication message MSG and the unique value UNQV to the memory controller 110. For example, the interface 340 may provide a communication interface such as a UART interface, an I2C interface, an SPI, an MIPI, or an eDP interface.

Figure 14:
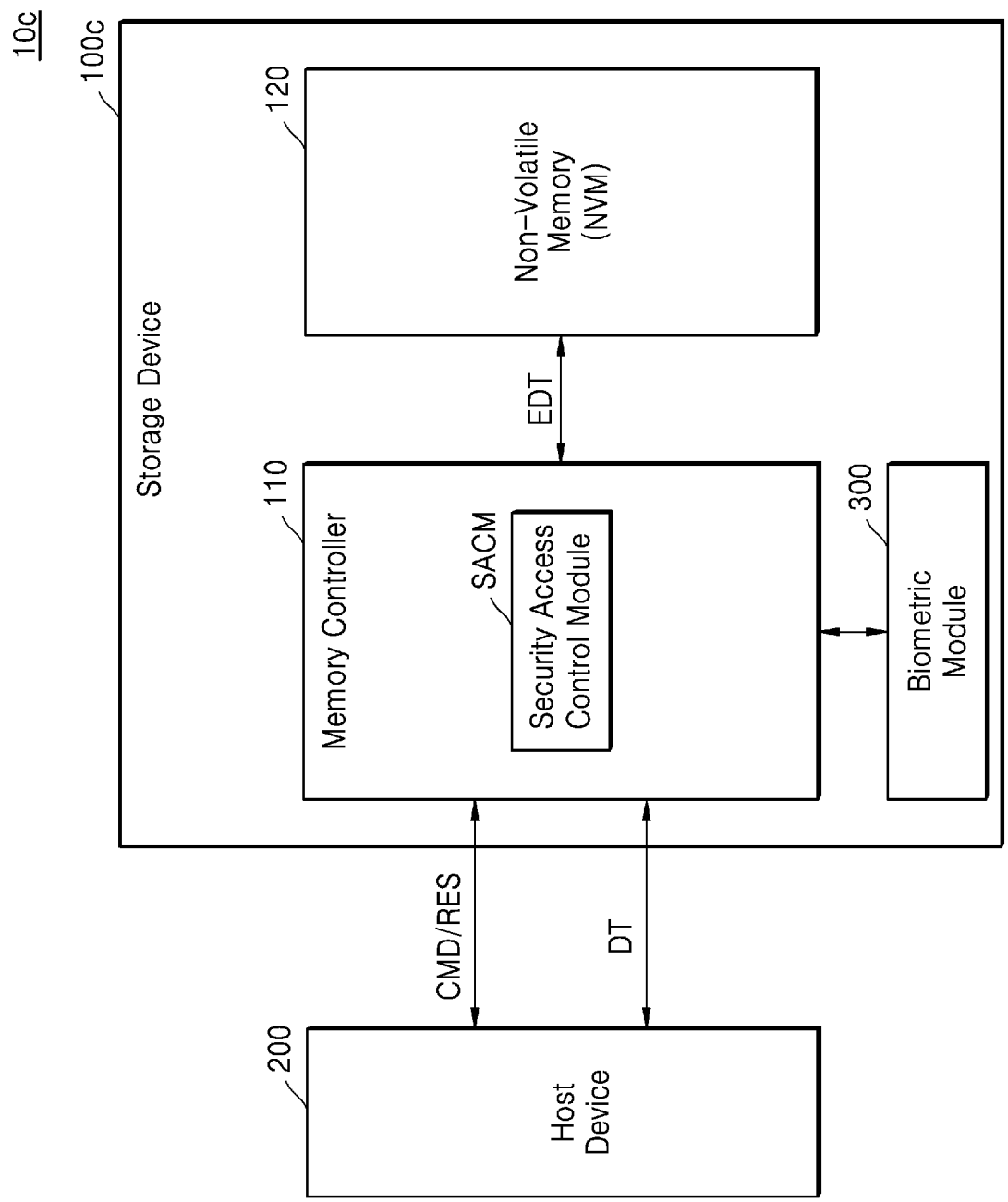
FIG. 14 is a block diagram of a storage device and a storage system, according to an example embodiment of the inventive concept.

FIG. 14 is a block diagram of a storage device 100c and a storage system 10c, according to an example embodiment of the inventive concept.

Referring to FIG. 14, the storage system 10c may include the storage device 100c and the host device 200. The storage device 100c may include the memory controller 110, the NVM 120, and the biometric module 300.

A configuration and operation of the storage system 10c may be similar to the configuration and operation of the storage system 10 of FIG. 1. However, according to an embodiment of FIG. 14, the biometric module 300 may be included in the storage device 100c. According to an embodiment of the inventive concept, the biometric module 300a of FIG. 13 may be applied as the biometric module 300 in FIG. 14. The biometric module 300 may store and manage biometric information and provide to the memory controller 110, in a user authority registration operation and a user authority authentication operation, BAD including a unique value based on the biometric information. However, the biometric module 300 is not limited thereto, and the biometric module 300 may obtain biometric data by sensing the living body of a user and provide the biometric data to the memory controller 110. The memory controller 110 may convert the biometric data into biometric information and store and manage the biometric information. The memory controller 110 may generate, based on the biometric information, a unique value to be used when user authority registration and user authority authentication are performed.

Figure 15:
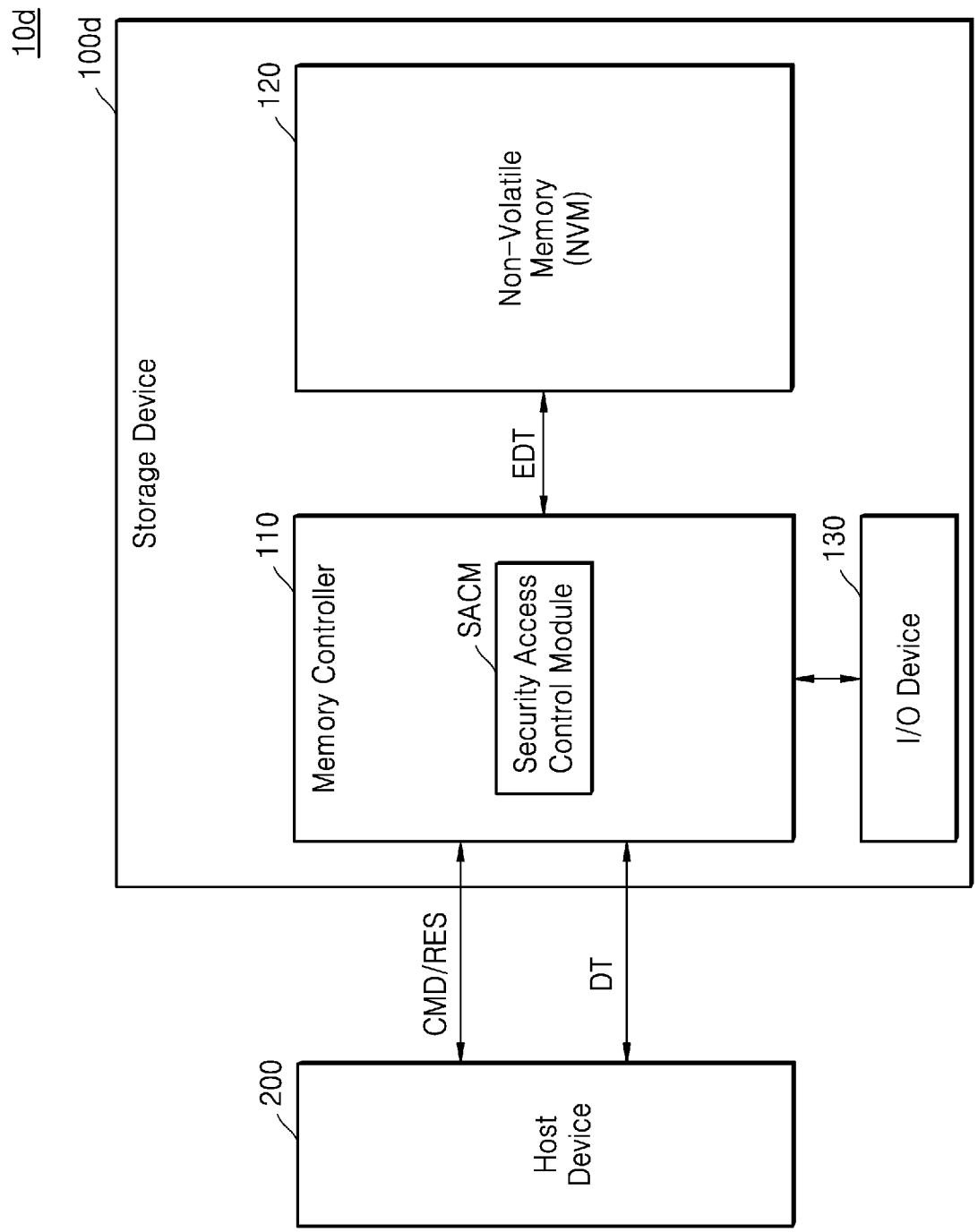
FIG. 15 is a block diagram of a storage device and a storage system, according to an example embodiment of the inventive concept.

FIG. 15 is a block diagram of a storage device 100d and a storage system 10d, according to an example embodiment of the inventive concept.

Referring to FIG. 15, the storage system 10d may include the storage device 100d and the host device 200, and the storage device 100d may include the memory controller 110, the NVM 120, and an input/output device 130. A configuration and operation of the storage system 10d may be similar to the configuration and operation of the storage system 10 of FIG. 1. However, according to an embodiment of FIG. 15, the storage device 100c may include the input/output device 130 and configure a security function based on a user input and/or BAD received through the input/output device 130.

The input/output device 130 may receive a user input and transmit the user input to the memory controller 110. For example, the input/output device 130 may be implemented by a touch screen, a screen including a function of sensing biometric data (e.g., a fingerprint, an iris, a face, or the like) of a user, or the like. Through the input/output device 130, a password of a user may be received, or BAD may be obtained, and the input/output device 130 may transmit the password or the BAD to the memory controller 110. The security access control module SACM may configure a security function by setting a user authority or performing user authority authentication based on the received password or the BAD.

According to an embodiment of the inventive concept, the input/output device 130 may receive a user's request, e.g., user authority registration, user authority authentication, user authority delete, or the like, and transmit the user's request to the memory controller 110 through a user interface, and the memory controller 110 may perform the user authority registration, the user authority authentication, the user authority delete, or the like in response to the user's request.

Figure 16:
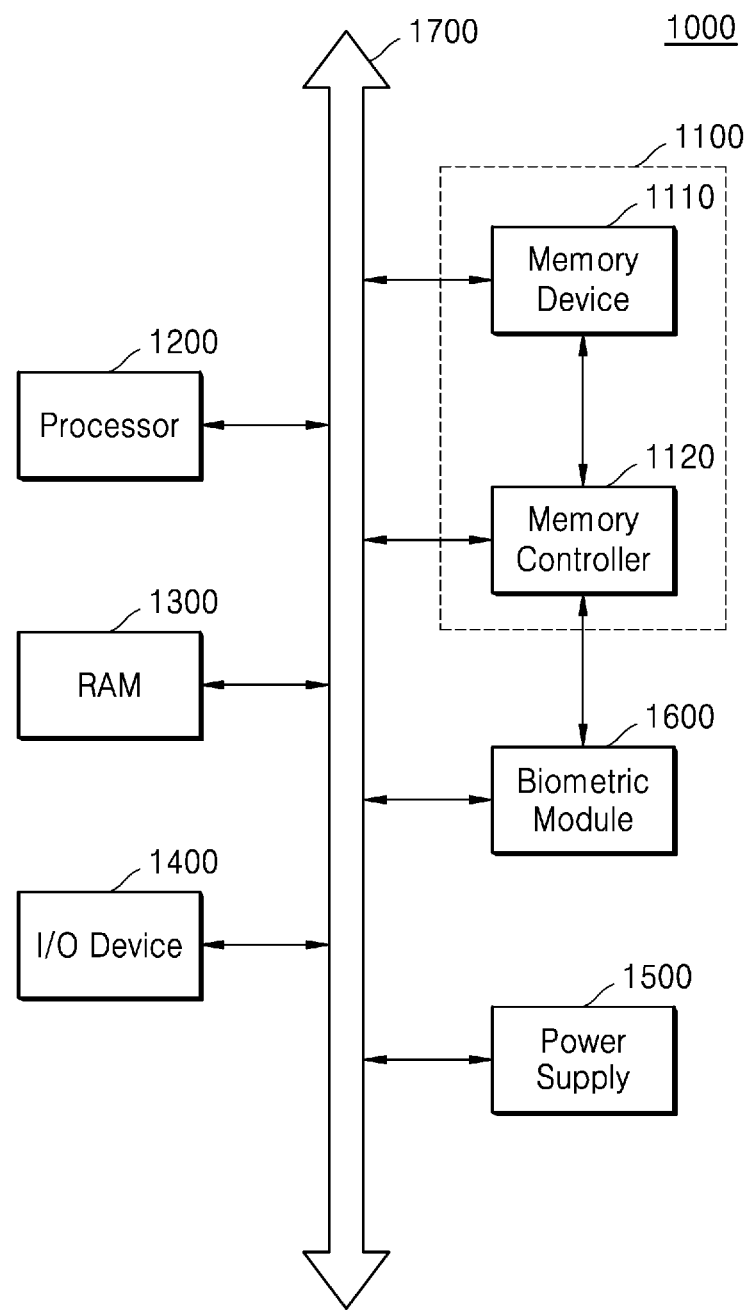
FIG. 16 is a block diagram of an electronic system according to an example embodiment of the inventive concept.

FIG. 16 is a block diagram of an electronic system according to an example embodiment of the inventive concept.

Referring to FIG. 16, a computing system 1000 may include a memory system 1100, a processor 1200, a RAM 1300, an input/output device 1400, a power supply 1500, and a biometric module 1600. Although not shown in FIG. 16, the computing system 1000 may further include ports communicable with a video card, a sound card, a memory card, a USB device, and the like or communicable with other electronic devices. The computing system 1000 may be implemented by a PC, implemented by a portable electronic device such as a laptop computer, a cellular phone, a PDA, or a camera, or implemented by an electronic device for a vehicle, which is provided in a car, an airplane, a vessel, or the like.

The processor 1200 may perform certain computations or tasks. According to an embodiment of the inventive concept, the processor 1200 may include a microprocessor or a CPU. The processor 1200 may communicate with the RAM 1300, the input/output device 1400, and the memory system 1100 through a bus 1700 including an address bus, a control bus, a data bus, and the like. The processor 1200 may also be connected to an extended bus such as a peripheral component interconnect (PCI) bus.

The memory system 1100 and the biometric module 1600 may be implemented by using the storage device 100 and the biometric module 300 shown in FIGS. 1 and 12. The memory system 1100 may include a storage device supporting self-encryption. The memory system 1100 may include a memory device 1110 and a memory controller 1120. The memory device 1110 may include a nonvolatile memory. When the processor 1200 provides a security command and a setting value (e.g., a password) according to a security standard protocol, the memory controller 1120 may perform at least one of user authority registration and user authority authentication based on the security command and the setting value received from the processor 1200. Alternatively, when the processor 1200 provides neither a security command nor a setting value, the memory controller 1120 may independently perform user authority registration and user authority authentication based on BAD received from the biometric module 1600.

The RAM 1300 may store data required to operate the computing system 1000. For example, the RAM 1300 may be implemented by a DRAM, a mobile DRAM, an SRAM, a PRAM, a ferroelectric RAM (FRAM), a resistive RAM (RRAM), and/or an MRAM. The input/output device 1400 may include an input device or an input interface such as a keyboard, a keypad, or a mouse and an output device or an output interface such as a printer or a display. The power supply 1500 may supply an operational voltage to operate the computing system 1000.

Figure 17:
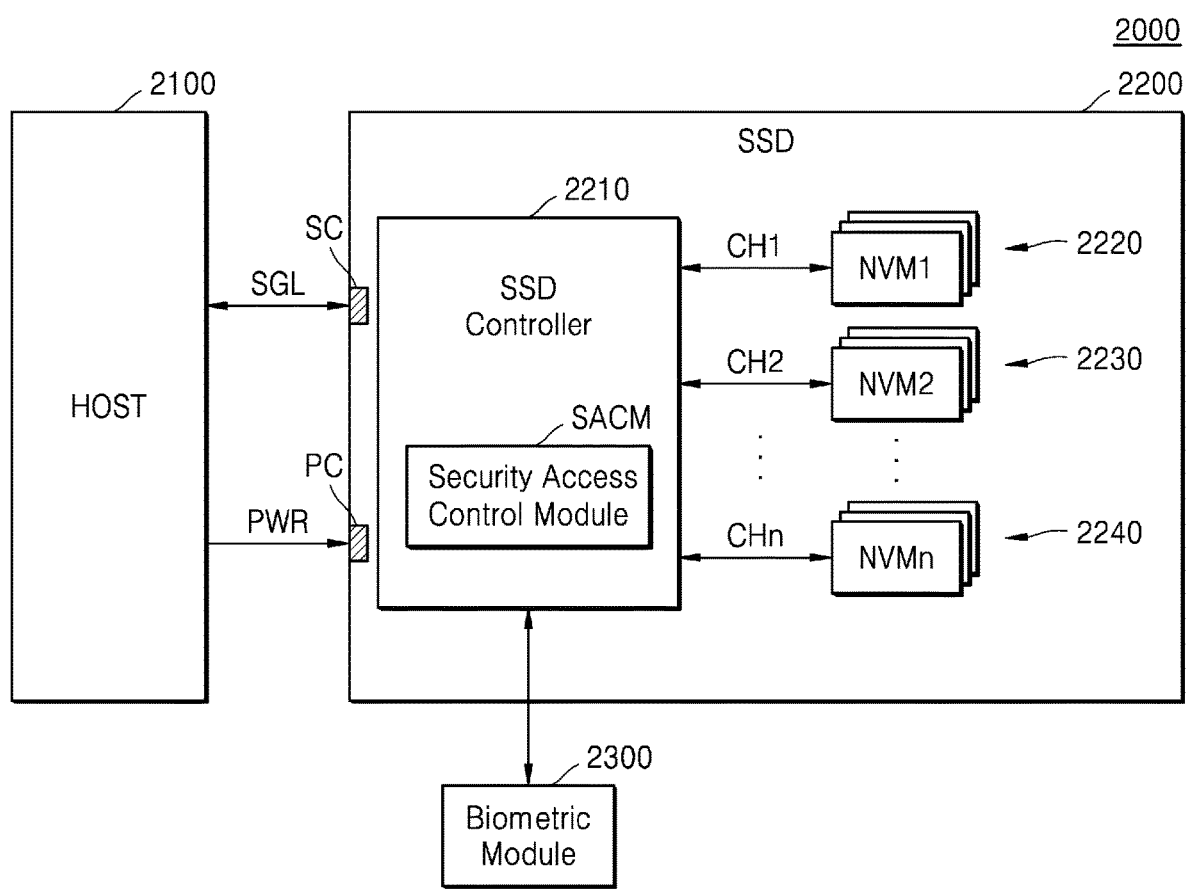
FIG. 17 is a block diagram of a solid state drive (SSD) and an SSD system including the same, according to an example embodiment of the inventive concept.

FIG. 17 is a block diagram of a solid state drive (SSD) 2200 and an SSD system 2000 including the same, according to an example embodiment of the inventive concept.

Referring to FIG. 17, the SSD system 2000 may include a host device 2100, the SSD 2200, and a biometric module 2300. According to an embodiment of the inventive concept, the biometric module 2300 may be included in the SSD 2200.

The SSD 2200 may transmit and receive a signal SGL to and from the host device 2100 through a signal connector SC and receive power PWR from the host device 2100 through a power connector PC.

The SSD 2200 may include an SSD controller 2210 and a plurality of NVMs 2220, 2230, and 2240. The storage devices 100, 100c, and 100d of FIGS. 1, 14, and 15 may be applied to the SSD 2200, and the memory controller 110 may be applied to the SSD controller 2210. The SSD controller 2210 may communicate with the plurality of NVMs 2220, 2230, and 2240 through a plurality of channels CH1, CH2, . . . CHn. The SSD controller 2210 may set a security function under control of the host device 2100 by performing user authority registration or user authority authentication based on a security command and a setting value received from the host device 2100 or independently set the security function based on BAD received from the biometric module 2300. Accordingly, the SSD controller 2210 may perform communication according to a security standard protocol to provide the security function regardless of whether the SSD controller 2210 is connected to the host device 2100 which provides a security command and a setting value associated with the security function or is connected to the host device 2100 that provides neither the security command and the setting value.

The storage systems 10, 10c, and 10d according to the above-described embodiments of the inventive concept may be equipped in or applied to not only the SSD system 2000 but also a memory card system, a computing system, a UFS, and the like.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing steps may employ any number of related art techniques for electronics configuration, signal processing and/or control, data processing and the like.

While the inventive concept has been particularly shown and described with reference to example embodiments thereof, it will be understood that various changes in form and details may be made therein without departing from the spirit and scope of the following claims.

What is claimed is:

1. A memory controller for controlling a nonvolatile memory, the memory controller comprising:
   a security access control module configured to:
      convert first biometric authentication data received from a biometric module into security configuration data having a data format according to a security standard protocol;
      determine, based on the security configuration data, field values of a feature set according to the security standard protocol; and
      perform, by using the field values of the feature set, authority registration of a user authority for an access control of a secure area of the nonvolatile memory, encrypted user data being stored in the secure area; and
   a data processing unit configured to, based on an access to the secure area being permitted, encrypt user data received from a host device or decrypt the encrypted user data read from the secure area.

2. The memory controller of claim 1, wherein the feature set corresponds to at least one of a plurality of security providers of a trusted computing group.

3. The memory controller of claim 1, wherein the security configuration data is implemented by a 512-byte data block according to the security standard protocol.

4. The memory controller of claim 1, wherein the security access control module is further configured to receive second biometric data from the biometric module, and perform authority authentication based on second biometric authentication data to open a session, set lock and/or unlock of the secure area of the nonvolatile memory through the session, and set master boot record shadowing.

5. The memory controller of claim 1, wherein the security access control module is further configured to, based on a storage device being connected to the host device, transmit an authentication trigger signal to the biometric module and perform authority authentication based on second biometric authentication data received from the biometric module.

6. The memory controller of claim 1, wherein the first biometric authentication data comprises a biometric authentication result and a unique value based on biometric data of a user.

7. The memory controller of claim 4, wherein the security access control module is further configured to, based on the authority authentication being successful, permit the access to the secure area by setting a write and read state of the secure area to an unlock state.

8. The memory controller of claim 7, wherein the security access control module is further configured to set a master boot record table such that a first master boot record included in the secure area of the nonvolatile memory is read.

9. The memory controller of claim 1, wherein the security access control module is further configured to transmit a registration trigger signal to the biometric module in response to reception of a user authority registration request, wherein the registration trigger signal requests the biometric module to store biometric data of a user.

10. The memory controller of claim 9, wherein the security access control module is further configured to perform the authority registration by setting a credential of the user authority based on the first biometric authentication data and activating the user authority.

11. The memory controller of claim 10, wherein the security access control module is further configured to, based on activation of the user authority, set a write and read state of the secure area to a lock state and set a master boot record table such that a second master boot record included in a non-secure area of the nonvolatile memory is read.

12. The memory controller of claim 1, wherein the security access control module is further configured to perform the authority registration based on a user authority registration request received from the host device.

13. The memory controller of claim 1, wherein the security access control module is further configured to perform the authority registration based on a user authority registration request is received from an input and/or output device separated from the host device.

14. The memory controller of claim 1, wherein the security access control module is further configured to transmit a delete trigger signal to the biometric module in response to reception of a user authority delete request and, based on a delete completion message being received from the biometric module, inactivate the user authority, wherein the delete trigger signal requests the biometric module to delete biometric data of a user.

15. A storage device comprising:
a nonvolatile memory including a secure area in which encrypted user data is stored; and
a memory controller configured to perform authority authentication on a user authority by determining, based on biometric authentication data comprising a biometric authentication result and a unique value based on biometric data of a user, a field value of a first feature set according to a security standard protocol with respect to the user authority for access to the secure area, and set the secure area of the nonvolatile memory to an unlock state based on the authority authentication being successful.

16. The storage device of claim 15, wherein the memory controller is further configured to, based on the storage device being connected to a host device, transmit a biometric authentication request signal to a biometric module and perform the authority authentication based on the biometric authentication data received from the biometric module.

17. The storage device of claim 16, wherein the memory controller is further configured to, in response to a user authority registration command received from the host device, set a credential of the user authority based on the biometric authentication data and activate the user authority.

18. The storage device of claim 15, wherein the memory controller is further configured to determine a field value of a second feature set according to the security standard protocol, a lock state and the unlock state of the secure area of the nonvolatile memory being controlled based on the field value of the second feature set.

19. A storage device comprising:
a nonvolatile memory including a secure area in which encrypted user data is stored; and
a memory controller configured to control the nonvolatile memory,
wherein the memory controller is further configured to:
based on the storage device being connected to a first host device, perform first authority authentication of a user having an access authority to the secure area based on a password received from the first host device according to a security protocol, the security protocol being set for communication with the first host device, and
based on the storage device being connected to a second host device, perform second authority authentication by determining a field value of a feature set according to the security protocol based on biometric authentication data received from a biometric module, wherein the biometric authentication data comprising a biometric authentication result and a unique value based on biometric data of the user.

* * * * *